United States Patent [19]

Grover

[11] Patent Number: 4,956,835
[45] Date of Patent: Sep. 11, 1990

[54] METHOD AND APPARATUS FOR SELF-RESTORING AND SELF-PROVISIONING COMMUNICATION NETWORKS

[75] Inventor: Wayne D. Grover, Edmonton, Canada

[73] Assignee: Alberta Telecommunications Research Centre, Edmonton, Canada

[21] Appl. No.: 255,748

[22] Filed: Oct. 19, 1988

[30] Foreign Application Priority Data

Nov. 6, 1987 [CA] Canada .................................. 551311

[51] Int. Cl.$^5$ ............................ H04J 1/16; H04J 3/14
[52] U.S. Cl. ...................................................... 370/16
[58] Field of Search ....................... 370/16, 13, 88, 58, 370/60; 371/8; 379/4, 22

[56] References Cited

U.S. PATENT DOCUMENTS

| | | | |
|---|---|---|---|
| 4,048,446 | 9/1977 | Hafner et al. | 370/16 |
| 4,635,237 | 1/1987 | Benestad et al. | 370/16 |
| 4,692,918 | 9/1987 | Elliot et al. | 370/16 |
| 4,701,756 | 10/1987 | Burr | 370/16 |

Primary Examiner—Robert L. Griffin
Assistant Examiner—Wellington Chin
Attorney, Agent, or Firm—Gerald J. Ferguson, Jr.

[57] ABSTRACT

A method and apparatus of restoring communications between a pair of nodes in a network having an arbitrary number of nodes and an arbitrary number of spans interconnecting the nodes, each span having working circuits between nodes designated for transmitting actual communications traffic and spare circuits capable of, but not designated for, transmitting actual communications traffic, the method comprising the steps of (a) establishing one or more independent communication paths between the pair of nodes through a series of spare circuits of spans interconnecting the pair of nodes and other interconnected nodes in the network; and (b) redirecting communications traffic intended for one or more failed spans interconnecting the pair of nodes through one or more of the paths.

76 Claims, 14 Drawing Sheets

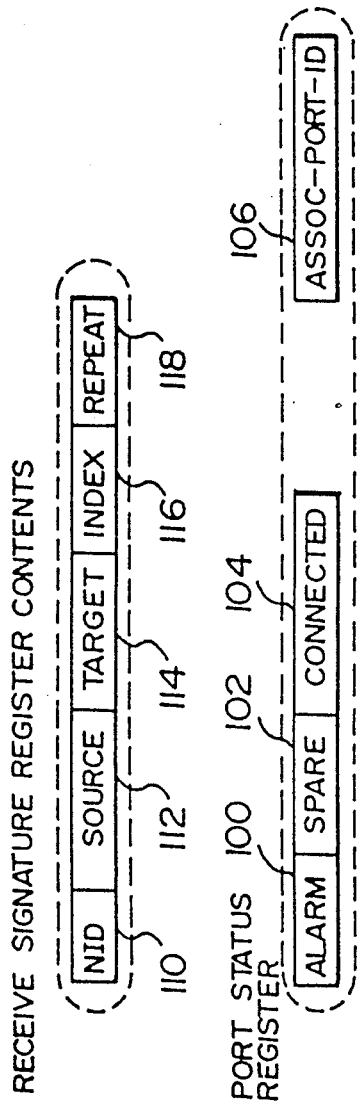
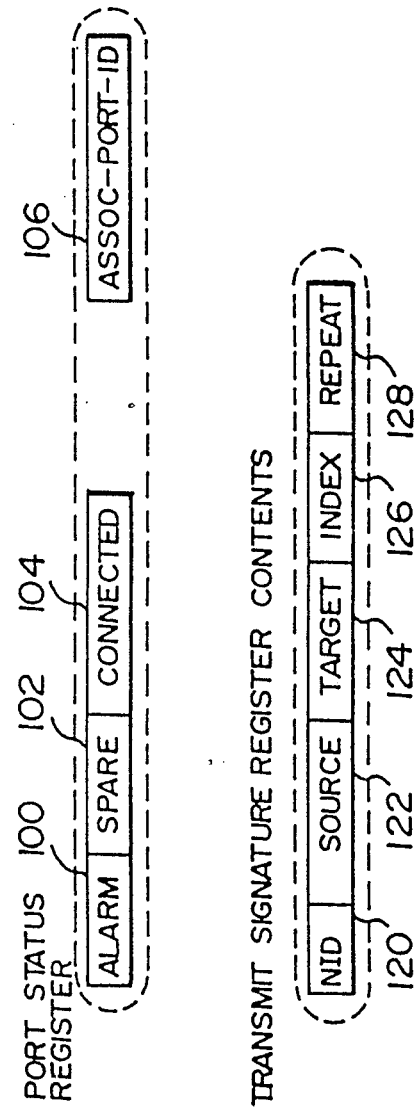
FIG.5(a)
FIG.5(b)
FIG.5(c)

- ALL SUBSEQUENT r'S WITH INDEXCOUNT=2 WILL NOW BE IGNORED
- r = ARBITRARY REPEATCOUNT VALUE ≤ REPEAT COUNT LIMIT

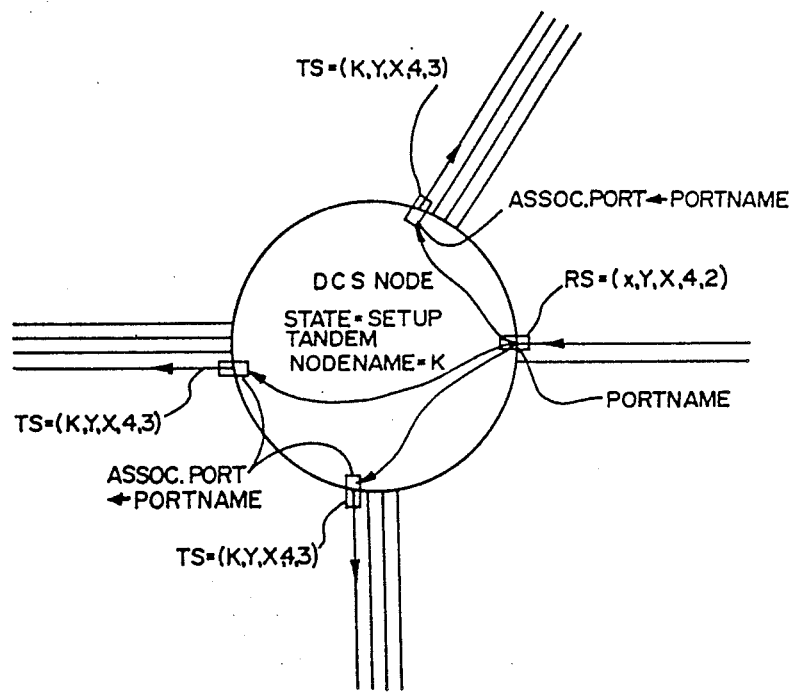
FIG. II

METHOD AND APPARATUS FOR SELF-RESTORING AND SELF-PROVISIONING COMMUNICATION NETWORKS

The present invention relates, in general, to a method and apparatus for rapidly effecting, in a communications network, the restoration of communications between nodes whose interconnecting spans have failed for one reason or another. More specifically, the present invention pertains to a method, apparatus and distributed control protocol for the real-time reconfiguration of Digital Crossconnect Switches to achieve rerouting of traffic around failures in a telecommunications network or for rapid identification and provisioning of new transmission routes between any two locations in a diverse network.

BACKGROUND OF THE INVENTION

Restoration is the re-establishment of trunk-bearing carrier groups after loss of all or most of the physical transmission facility between two sites, through geographical rerouting via redundant network capacity. Rerouting for restoration of the physical transport network should not be confused with the routing of individual calls or with the architecture of the logical trunking network administered at the DS-1 transport level. These will remain unchanged by a successful restoration at the DS-3 level.

As a cable-based technology, FOTS has proven susceptible to frequent damage due to construction work, lightning strikes, rodent damage, craftsperson error, train derailment, etc. With the inherent capacity of FOTS, and reduced physical route diversity in fiber-based networks, a cable cut can seriously affect network blocking because each fiber carries many diverse logical trunk groups. Structural availability of fiber cable in real networks is reported as low as 96.5% (300 hours/year downtime) at a cost up to $75,000 US per minute of outage. By comparison, radio transcontinental routes typically do meet requirements of 99.985% for structural availabilities without special restoration methods. It therefore seems unavoidable that advanced methods of restoration are an essential adjunct to the widespread deployment of fiber networks.

The conventional method for restoration of a fiber cable cut is manual rearrangement at passive DSX-3 crossconnect panels. The sequence of patch operations is determined from stored plans or is developed at the time of restoration. Crews are dispatched first to patch the rearrangements and then to proceed with physical fault location and repair. The time to restore traffic averages from 6 to 12 hours.

The current industry plans are that with the advent of DCS 3/3 (or DCS 3/1) machines, the above restoration method will be automated through remote control of DCS-3 machines. Some of the problems and limitations with the planned approach are:

Speed: Although centralized control of DCS-3 machines will significantly reduce restoration times compared to manual patching, there is little expectation of approaching realtime reconfiguration capabilities with centralized control. Estimates within the industry place restoration times initially around 1 hour, improving to perhaps 10 minutes when the centralized DCS management systems are mature.

Database Dependency: The centralized approach raises concern about the size, cost, complexity and vulnerability of the surveillance and control complex that will be needed for transport management. The centralized approach will be dependent on the ability to maintain a complete, consistent, and accurate database image of the network over years of operation. Eventually a maintenance change that is not immediately and correctly reflected in the database creates the possibility of service-affecting error during a centrally controlled restoration or reconfiguration event.

Traffic Impact: With centralized control, all calls-in-progress will continue to be lost whenever a cable is cut because the outage duration remains much longer than voice call-dropping thresholds and data protocol timeouts. This means that with centralized control, span protection switching will continue to be required in transmission systems to handle single carrier failures with enough speed to avoid call dropping.

Telemetry Dependency: Centralized control of DCS machines also requires redundant telemetry arrangements so facility cuts will not remove the very communications links over which the central control site is to issue restoration commands. This requires redundant communications interfaces on the DCS equipment and special circuit engineering considerations for the operating company.

SUMMARY OF THE INVENTION

The present invention seeks to provide a method and an apparatus which overcome the disadvantages of current restoration methods and apparatus and more specifically which will rapidly and automatically effect restoration between two or more nodes in a network whose interconnecting spans have failed.

In accordance with one aspect of the present invention, there is provided a method of and apparatus for restoring communications between a pair of nodes in a network having an arbitrary number of nodes and an arbitrary number of spans interconnecting the nodes, each span having working circuits between nodes designated for transmitting actual communications traffic and spare circuits capable of, but not designated for, transmitting actual communications traffic. The method comprises the steps of (a) establishing one or more independent communication paths between the pair of nodes through a series of spare circuits of spans interconnecting the pair of nodes and other interconnected nodes in the network; and (b) redirecting communications traffic intended for one or more failed spans interconnecting the pair of nodes through one or more of the paths.

In accordance with a more specific aspect of the present invention, there is provided a restoring apparatus incorporated into each node of a communications network having an arbitrary number of nodes and an arbitrary number of spans interconnecting the nodes, each span having working circuits between nodes designated for transmitting actual communications traffic and spare circuits between nodes capable of, but not designated for, the transmission of actual communications traffic. Each node has one or more bi-directional transmission interfaces connected to external transmission lines and to an internal switching matrix. Each transmission interface has circuit means for processing signals received along a receive link and feeding the received signal to the switching matrix an circuit means for processing transmit signals received from the switching matrix and applying the transmit signal to a transmit link. The restoring apparatus comprises restoration signature detecting circuit means at each the transmission interface for detecting and storing restoration signatures received along the receive link, restoration signature transmitting circuit means at each transmission interface for applying transmit restoration signature signals to the transmit link; and control means operatively connected to the detecting circuit means and the transmitting circuit of each the transmission interface. The control means is responsive to (a) an alarm signal indicative of a circuit failure in a span connecting the node in which the control means is disposed and an adjacent node for generating and repeatedly applying predetermined restoration signature signals to the restoration signature transmitting circuit means of one or more of the transmitting interfaces whereby to cause the restoration signals to be transmitted along one or more transmitting links to other adjacent nodes, (b) a restoration signature detected by the detecting circuit for producing modified restoration signatures and applying the modified restoration signatures to the transmitting circuit means of each the transmission interface of the node whereby to cause the modified restoration signatures to be transmitted along the transmitting links to adjacent nodes, (c) a modified restoration signature received at the detecting circuit means of one of the transmission interfaces for generating a complement restoration signature signal and applying the complement restoration signature signal to the transmitting circuit means of the one of the transmission interfaces, and (d) a complement restoration signature received at the detecting circuit means of one of the transmission interfaces for either operatively connecting the receive and transmission links of the transmission interface at which the complement restoration signature signal was received with the transmission and receive links, respectively, of the transmission interface on which the restoration signature associated to the complement signal was received if the control means modified an existing restoration signature, or operatively connecting the receive and transmission links of the transmission interface at which the complement restoration signature signal was received with the transmission and receive links, respectively, of the transmission interface on which communications traffic intended to be transmitted through a failed circuit between the pair of nodes if the control means generated the original restoration signature associated with the complement restoration signature signal.

In this way, one or more alternate and independent communication paths are established between the pair of nodes through spare circuits of spans interconnecting the pair of nodes and other interconnected nodes in the network.

Thus, the present invention provides an arrangement whereby the computation of network restoration plans are distributed among the Digital Crossconnect Switches (DCS) processors in a network so that reroutings are computed and executed automatically in realtime without recourse to centralized control or databases.

While not limited thereto, the present invention uses DCS machines in the DS-3 or SONET transport network to create a network-wide reflex reaction which achieves facility restoration of complete cable cuts in a very short period of time. Experimentation on network models have shown groups of up to eight DCS machines coordinating their actions in accordance with the present invention perform complex restorations of complete cable cuts in less than one second and restoration coverage efficiencies have been found to be equal to the restoration plans obtainable by human inspection of the same networks. When a single circuit fails, but the cable is not cut, the present invention behaves like an Automatic Protection Switching (APS) system, reacting in 100 to 200 msec. The technique is distributed and uses the network entities directly as its database. It is contemplated that the present invention constitutes a simple, high performance realtime assistant to centralized administrative control of the transport network thereby removing the demand for realtime response from network operations centers.

In the detailed description which follows, reference is made to the combination of apparatus and method as "Selfhealing" and focuses, for practical application and descriptive purposes, on the application of Selfhealing to the third level of the North American and international transmission hierarchy. Digital Cross-Connect machines at this level are denoted as DCS-3 and the prime responsibility for transport network restoration resides at this level. It is to be understood that DS-3 may equivalently read "STS-1" because the Selfhealing process is functionally identical at the STS-1 interconnect level of a future SONET network. Only the details of restoration signature transport vary.

Although Selfhealing itself operates entirely without central control, it does not replace centralized network control. Selfhealing is seen to be deployed as a realtime field-assistant to a centralized Network Operations Center (NOC). In this way, the overall coordination, monitoring and administration of the transport network remains under centralized control but the difficult requirement for near-realtime response from the central control complex is removed.

The present invention is primarily of value to manufacturers and telephone network operating companies as a realtime assistant to centralized network operations systems by permitting DCS machines to restore cable cuts without call-dropping, replace span protection switching subsystems in transmission equipment, reduce speed and database requirements for centralized network control systems, and reduce the structural availability and redundant capacity requirements of fiber optic networks.

The present invention offers the advantages of replacing span protection switching with network wide automatic protection and unifying the traditionally separate functions of protection switching and network restoration. Further, it has no database requirements, no dependency on telemetry or availability of the central control, and the potential speed to restore entire cable cuts without call dropping and the prospect of eliminating automatic span protection switching (APS) in transmission equipment.

BRIEF DESCRIPTION OF THE DRAWINGS

These and other features of the invention will become more apparent from the following description in which reference is made to the appended drawings wherein:

FIG. 5 illustrates the content and organization of information in the signature registers shown in FIG. 4 according to the preferred embodiment of the present invention;

FIGS. 7 to 14 illustrate the manner in which the latter three logic blocks interact with signatures in the preferred embodiment of the present invention;

FIG. 7 schematically illustrates the principle by which a node adopting the SENDER state initiates the forward signature flooding step of the present invention;

FIG. 8 schematically illustrates the principle manner in which a node in the CHOOSER state, responds to signatures arriving at its site, initiating the reverse-linking step of the present invention for one of the several restoration paths that may be required;

FIG. 9 illustrates the principle manner in which a SENDER node reacts to a signature from the CHOOSER arriving at its site after completion of forward flooding and operating a crosspoint to connect to the restoration path that is known by the method of the present invention to now exist between SENDER and CHOOSER nodes;

FIG. 10 illustrates the step by which the CHOOSER node determines which crosspoint to operate to complete the re-routing of one of the several signals disrupted by a given span cut;

FIG. 11 schematically illustrates the basic manner in which a node in the TANDEM state rebroadcasts an appropriate new signature arriving at its location;

FIG. 12 schematically illustrates the manner in which a node in the TANDEM state reacts to the arrival of a signature initiated by the SENDER node when such signature meets the conditions of being a superior precursor signature for some existing transmit signature rebroadcast than the existing precursor receive signature associated with the rebroadcasted signatures;

FIG. 13 schematically illustrates the manner in which a node in the TANDEM state reacts to the arrival of a reverse-linking signature when such signature creates a complement pair of signatures on one port of the node in the Tandem state; and FIG. 14 schematically illustrates the manner in which a node in the TANDEM state reacts to the disappearance of a received signature at its location and also shows, in conjunction with FIG. 11, how the TANDEM node reacts to a signature that does not disappear but changes since such an event is treated as the disappearance of the first signature (FIG. 14) followed by appearance of the second signature (FIG. 11).

DESCRIPTION

Figure 1A:
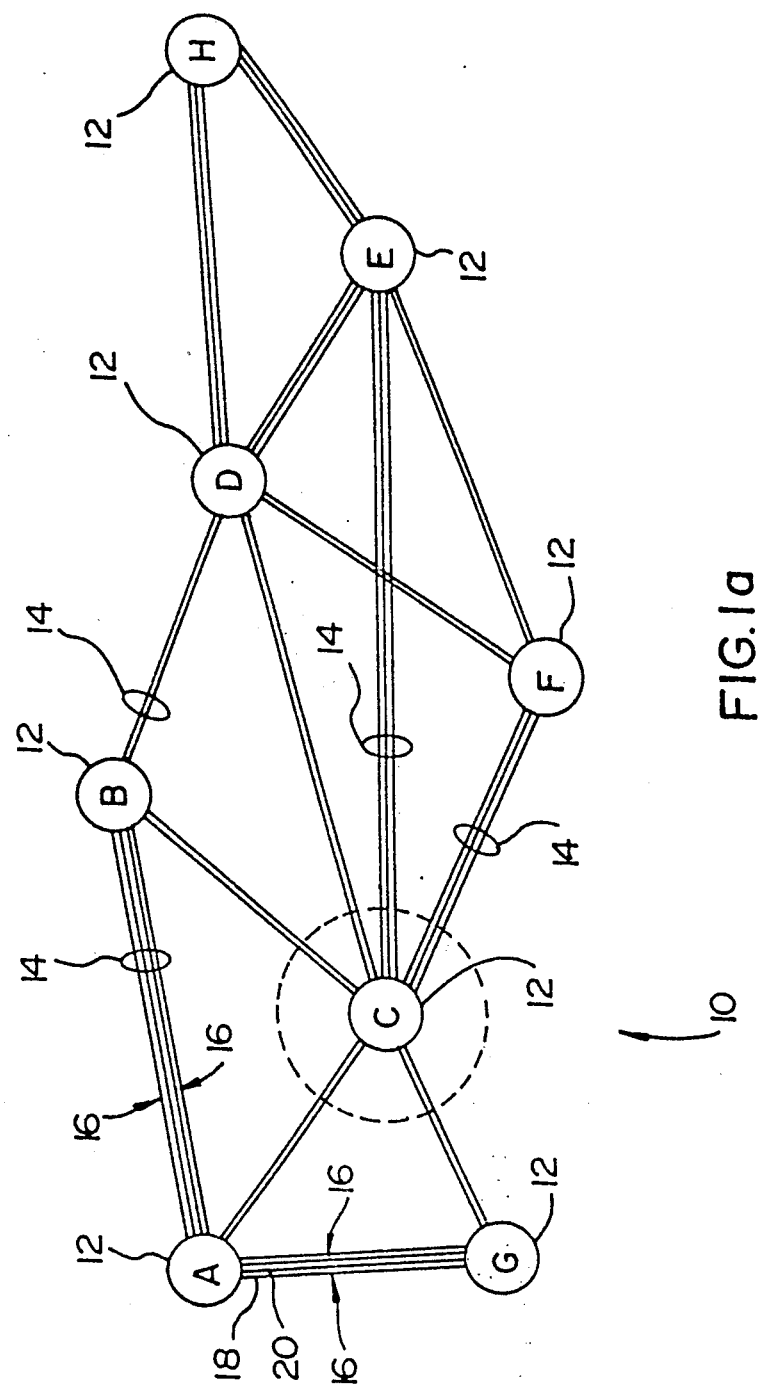
FIG. 1 shows examples of communications networks and the components of such networks that pertain to the present invention.

The first portion of the following description explains the overall principles and mechanisms of operation over an entire network and introduces the terminology and related concepts required to appreciate the method. The key objective to be explained is the manner in which distributed DCS machines, endowed with signature transmission and reception and certain other hardware including a controller to implement the signature manipulation logic, are enabled to individually and independently act in a manner such that the network as a whole rapidly executes a coherent restoration plan, such plan appearing, prior to the present invention, to be possible only through centralized global observability and control of the network.

The second portion of the following description relates to the details of the specific embodiment of the invention which has been realized and explains the lower-level details through which the objects of the invention are achieved, these more detailed considerations being amenable to description only after the more general description has been completed.

GENERAL DESCRIPTION

Selfhealing is a property of a network, not of a node, although the necessary elements for a Selfhealing network reside within the DCS machines in the nodes of the network. A network is endowed, in accordance with the present invention, with the property of Selfhealing by two elements: a Selfhealing logic controller in each DCS-3 machine and transparent signaling circuits, physically associated with each transmission line interface port (DS-3 or STS-1 for example), and a corresponding transmission method for the transparent transportation of restoration signatures over these same transmission links.

SELFHEALING RESTORATION SIGNATURES

The various nodes of a network equipped with the apparatus for Selfhealing interact through restoration signatures on the links between them. Signatures are significantly different from messages between processors as might usually be provided in a multiprocessor or in a packet communications environment. A signature is an attribute of a unidirectional transmission link and is physically inseparable from that link. A signature is not addressed to any particular other node and Selfhealing nodes do not directly interchange messages or directly address each other for co-ordination of information or control between their controllers. Rather, the execution of each Selfhealing controller affects the execution of all other nodes only through its influence on the signatures in its vicinity. The Selfhealing controller is in one sense a specialized computer structure for processing of signatures. Each controller instance affects its neighbors by changes it makes in the number, content and link association of the signatures originated from its site in response to the signatures arriving at its site.

Signatures are physically associated with each DS-3 (or STS-1) entity in the network but are invisible to the traffic on those links. Selfhealing controllers initiate, manipulate, modify and terminate signatures in a process that permits each DCS machine in the network to derive local crosspoint operate decisions that, through this invention, automatically coordinate with the similarly derived decisions made at other DCS machines. The network-level result is restoration, although each node has no knowledge of the topology of the network that it is in. In the present implementation, restoration signatures are 5-word quantities, described later, repeatedly impressed onto the individual DS-3 signals by one of several possible methods.

An analogy that may help in the understanding of the role of signatures is the following: Signatures are to some extent like tokens in a game. In this analogy, Selfhealing works through a formal set of rules for the creation and elimination of the tokens of the game. In addition each node seeks a goal that is specified in terms of certain types of matched signatures (later called complements), which results in a certain reward: permission to operate specific crosspoints. Furthering this analogy, no player (node) in the game knows about the higher level objective that is indirectly achieved (network restoration), although the design of the game is actually directed to achieve this meta-objective which is unknowable to any individual player.

METHODS FOR SIGNATURE TRANSPORT

The requirement for signature transport is easily met in the SONET network by reserving one of the existing un-allocated signaling fields for this purpose.

In DS-3 based networks, signature transport requires new techniques because there is no built-in means to provide for supervisory information transport in the existing DS-3 format. The only defined signaling entity, the X-bits, are reserved for customer use. As a related part of this work, the present patentee has researched three techniques for transparent auxiliary channel signaling in the DS-3 format. A proposed method that is compatible with both asynchronous DS-3 and SYNTRAN modulates auxiliary information onto the F-bits of the DS-3 in such a manner that framing performance is only trivially affected.

A second method that provides a higher auxiliary signaling rate but is not SYNTRAN compatible, substitutes auxiliary information bits for the dummy bits present in subframe 7 of the asynchronous DS-3 format whenever positive pulse stuffing occurs.

A third method exists in circumstances where the C-bits of the conventional DS-3 signal are liberated for new uses. The third method is based on synchronization of the intermediate DS-2 tributaries in jump-level M13 multiplex terminal equipment to permit ganged stuffing in the M23 stage.

Any or all of these signature transport strategies could be used for Selfhealing in DS-3 networks. Each of the methods requires a DS-3 F-bit framing function but relatively little additional circuitry. DS-3 F-bit framing is now a fairly standard VLSI circuit function likely to be provided in the port cards of most or all DCS-3. DCS 3/1 designs must perform DS-3 framing for DS-1 access. High performance DCS 3/3 designs do DS-3 framing for performance monitoring reasons. Therefore, none of these methods of signature transport in DS-3 networks is expected to create a major obstacle to hardware support of Selfhealing in new DCS-3 products.

THE SELFHEALING LOGIC CONTROLLER

Figure 6:
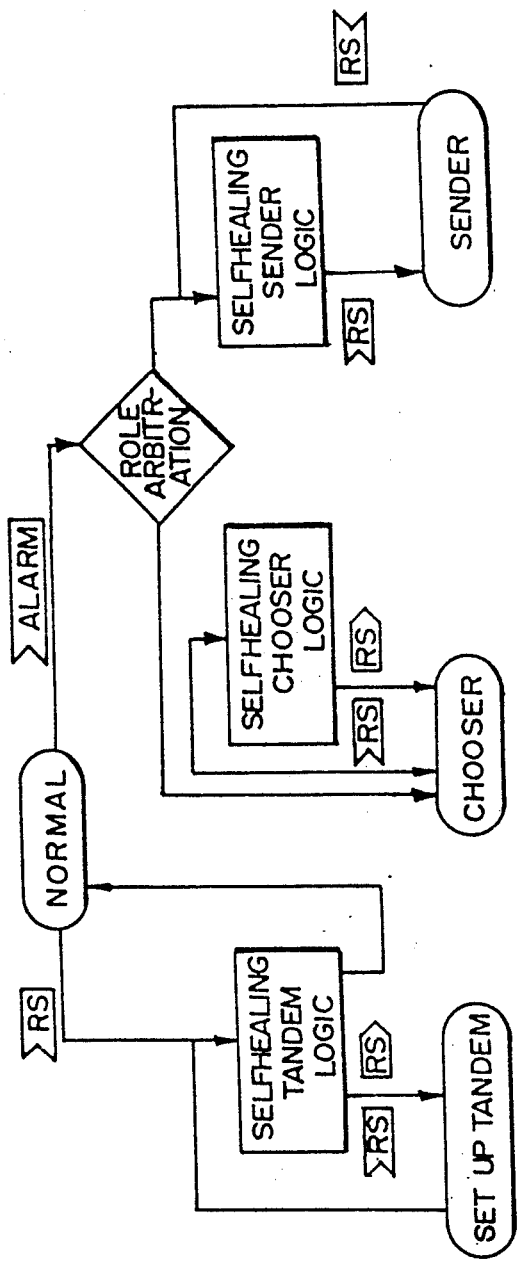
FIG. 6 illustrates the highest level logical structure of the restoration controller according the preferred embodiment of the present invention as a Finite State Machine having four states including NORMAL, SENDER, CHOOSER and SETUP-TANDEM states and three major logical processing blocks for the manipulation of signatures in a manner such that automatic restoration is affected.

The Selfhealing controller is implemented as a state machine, shown at its highest level in FIG. 6, and in accordance with the Pascal language Protocol Specification which appears in Appendix A. The Selfhealing controller has five states and three major control logic functions, the general behaviour of which will become apparent from the following first level description of the manner in which the Selfhealing control logic interacts with signatures in the network to cause the overall result of automatic distributed co-operative restoration.

A Selfhealing network restoration event can be analyzed as having two major conceptual phases: (1) a network signature flooding wave, and (2) a reverse signature linking sequence.

Network Signature Flooding: A Selfhealing action begins when a cable cut (or equivalent emergency) occurs on a transmission span within the network. Whenever this happens, existing transmission monitoring equipment raises central office maintenance alarms within approximately 10 milliseconds of the loss of transmission integrity. In this invention, the DCS machines in the two affected end nodes are arranged to be immediately informed of any such traffic-affecting major alarms. The alarms may be generated by the transmission terminal equipment and wired to the DCS or may be generated by appropriate circuitry in the port cards of the DCS machines depending on the C.O. equipment arrangements. In either case, reliable detection of the fault with adequate persistence checking is an established aspect of transmission system design, not part of the present invention, except that these alarms must be communicated to the DCS machine at each node in the fastest possible manner, preferably by direct electronic connection to the primary alarm detection circuits. It is to be noted that, given a network with Selfhealing properties, the artificial creation of pseudo-faults is of interest as a means to exploit the basic routing mechanism as an advanced real-time provisioning tool. A discussion of this variation will follow.

Figure 3:
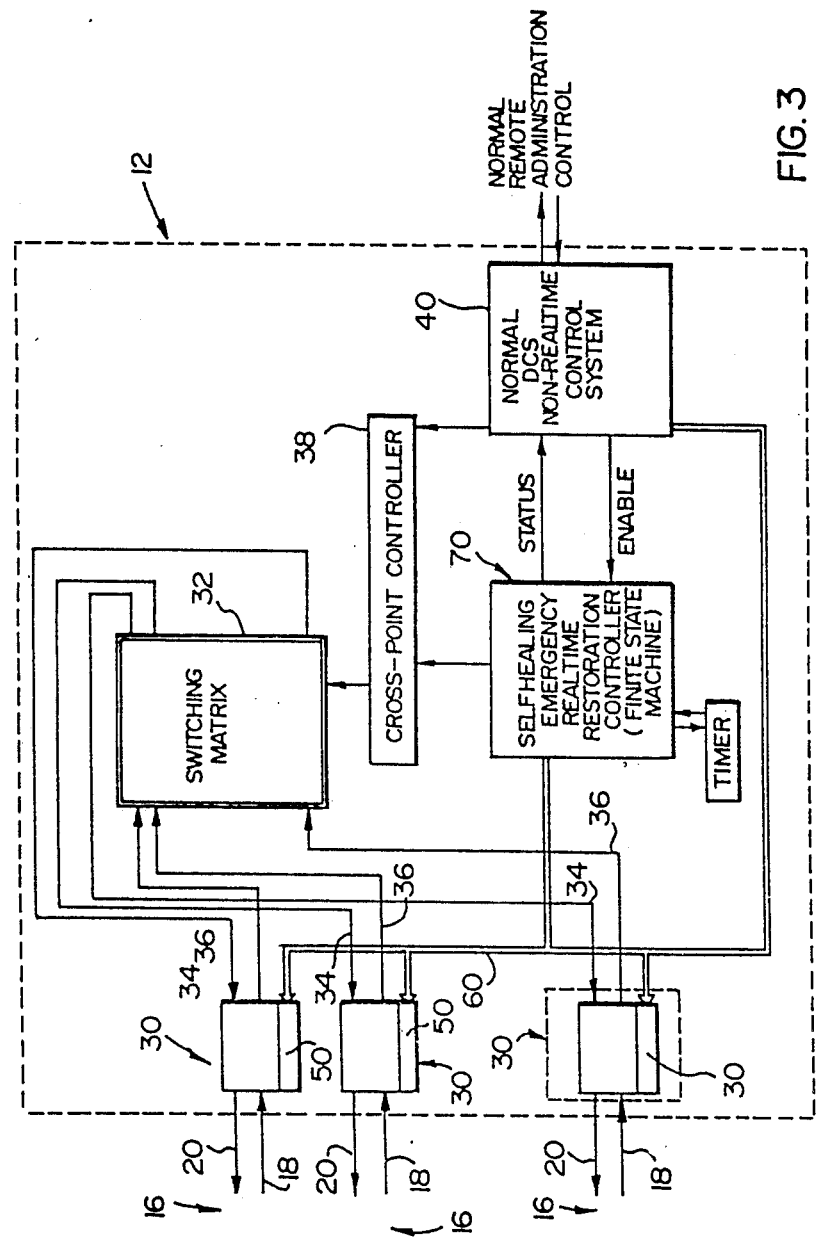
FIG. 3 schematic illustrates a digital cross-connect machine equipped with the necessary elements so that when each node of the network in FIG. 1 is so equipped, the objective of a self restoring (or "self healing") network is achieved.

The occurrence of a traffic-affecting transmission alarm causes the affected DCS to give priority to the Selfhealing controller as opposed to the normal operational controller shown in FIG. 3. In the most frequent and practical case of one network span-failure at a time, the Selfhealing controller is initially in the Normal state. Multiple simultaneous faults can be handled but are discussed later. In the Normal state, the Selfhealing controller first identifies the number and port ID(s) of the failed transmission links. The controller then reads the last valid contents of a receive signature register on the affected port(s), learning the identity (ID) of the node to which connectivity has been lost, the remote-failure node. This is the preferred form of Selfhealing in that each node maintains strictly zero knowledge except its own name. All information that is needed arrives at each node on the links connected to it. Rearrangements in the network are thereby self-updating so no node can have outdated information. A more conservative approach is to store and maintain neighbor node ID tables in each DCS. Selfhealing can also work this way, but with additional administrative requirements.

When the Selfhealing controller recognizes the alarm and has read the receive signature registers on the failed port(s), it then does a simple ordinal-rank test on the remote-failure node ID with respect to its own ID to determine whether to act as 'SENDER' or 'CHOOSER' in the subsequent restoration event. The outcome of this test is arbitrary but it guarantees that one node will adopt the SENDER role and the other becomes CHOOSER. Every node controller is capable of either role and will adopt one or the other depending on the arbitrary name-rank of the two nodes involved by any given span failure. Any arbitration rule conducted independently at each node with the limited information available to nodes and which ensures the above complementary role adoption will suffice for this aspect of the invention.

The node adopting the SENDER role immediately triggers what is called the Forward Signature Flooding wave by broadcasting appropriately indexed restoration signatures on some or all spare DS-3 transmission links leaving the location of that DCS, wherever those links go in the network. In milliseconds, these signatures then appear in the signature-receiving circuits of the DS-3 interfaces of neighboring DCS machines and cause those DCS machines to activate their respective Selfhealing controller.

When the Selfhealing controller is activated by receipt of a restoration signature on a normal spare circuit, rather than by an alarm on a working circuit, the controller enters the Setup-Tandem state, also called simply the TANDEM state. Selfhealing controllers in the Setup-Tandem state execute the Selfhealing Tandem Logic block of FIG. 6, the main effect of which is the selective rebroadcast of incoming signatures on all spare links from that node location. This activates yet more DCS nodes into the Tandem state and so on so that DCS nodes throughout a certain range of the SENDER are rapidly alerted into the Tandem state and a large number (possibly all) of the spare links of the network within the affected range have been impressed or modulated with the appropriate set of unique signatures. The extent of the influence of the forward flooding signature wave is controlled by a maximum repeat (MR) parameter which sets the maximum range (in spans) from the SENDER node within which Selfhealing is allowed to range. Signatures exceeding the MR are not propagated further. An advanced strategy is to let the MR increase as a function of time and of the current degree of success after the initial fault. Another variation is to make the MR a table-function of the node-to-node relation requiring restoration. Use of the range-of-influence limiting MR mechanism is a practical, not an essential, consideration. This invention also functions safely and reliably without any range limitation mechanism.

Therefore, in the manner just described, the first reaction of the Selfhealing network to a facility failure is the determination of SENDER and CHOOSER nodes for the particular failed span, a wave of restoration signatures radiating from the SENDER, identifying and allocating a signature to existing spare links (in a detailed manner which follows), and a collection of DCS machines of the network which are alerted to the Tandem state and ready to further help in the co-operative re-routing effort.

As can be appreciated, an important eventual effect of the forward flooding process is that if there are any possible routings that could be constructed by the series concatenation of spare links between SENDER and CHOOSER in the given network within the allowed range of influence, then one or more signatures of the forward flooding wave signatures will arrive at the CHOOSER node. If this occurs, the CHOOSER node triggers the reverse signature linking sequence. If no signatures ever reach the CHOOSER node, then it can be shown that no method, whether using centralized control and overall network knowledge or not, can restore the given fault in the given network.

Reverse Signature Linking: In the cases of realistic interest in telecommunications networks, which are by necessity designed with adequate route and capacity redundancy, one or more forward flooding signatures eventually, through the above process, reach the CHOOSER node. This implies there is at least one potential series of spare links between DCS machines related backwards in a cause-effect chain anchored at the SENDER, but it does not yet mean that a restoration path has been found. A signature that arrives at the CHOOSER does not uniquely identify a route or even imply the existence of a unique route for every signature, nor does a number of signatures arriving equal to the number of lost circuits imply a number of routes can be found that equal the restoration requirement. The problem at this stage is to select and actualize or construct, and then uniquely identify end-to-end, the required number of new routes between SENDER and CHOOSER from the signatures now existing on spare links throughout the network. It is part of this invention that this function is accomplished in a distributed co-operative manner as follows.

When certain forward flooding signatures arrive at the CHOOSER node, a reverse-linking process is triggered which will trace out one of the potential paths as desired, through a number of co-operating Tandem nodes. To initiate the reverse-linking mechanism so as to create one of the required rerouting paths, the CHOOSER applies a complementary signature (to be described in detail) on a link having a preferred arriving signature. The CHOOSER node emits no signatures other than in response to certain forward flooding signatures that arrive at its site.

When this reverse-linking signature arrives at a node that is in the Tandem state, the Tandem-state Selfhealing controller acts according to the Tandem Logic block in FIG. 6. The detailed behaviour of the TANDEM node in these circumstances is described later. Suffice it to say now that the net effect of this is the selective deletion of certain forward flooding signatures from the Tandem node site, the possible operation of a specific DCS matrix crosspoint and the manipulation and retransmission of the complementary signature on the transmit direction of the DS-3 on which the appropriate forward flooding signature is present.

When, through one or more tandem nodes acting as above, a complementary reverse linking signature arrives back at the SENDER, a complete bi-directional restoration circuit is known to have been established between SENDER and CHOOSER. Although this new circuit can be routed through a number of cooperating DCS (up to the MR limit) which have already operated the crosspoints required along this new route. The SENDER node does not know the routing of this new path, but can deduce its span length (from signature-borne information) and is assured by the method revealed here that the other end of the new path is indeed connected to the CHOOSER node, i.e. the node to which connectivity has been lost.

The SENDER then operates local crosspoints to substitute this path for a certain one of the failed circuits and suspends certain of its original signature broadcasts. The Selfhealing control logic ensures that SENDER and CHOOSER both substitute this route for the same one of the many DS-3 entities that may be managed in a single restoration. The overall mechanism described above for achieving a single rerouting path actually occurs in parallel for a number of reroutings in a Selfhealing network until no further restoration is possible or all traffic on lost circuits has been restored. It is part of the art of this invention that what occurs as described above to find one rerouting also succeeds for a number of reroutings being sought simultaneously and in parallel using the same cooperating Tandem nodes. The overall complexity of Selfhealing network behaviour when simultaneously restoring a number of lost circuits in a realistic network topology is very high. Consequently the way this invention has necessarily proceeded was to focus on achieving the exact specification of rules for signature manipulation by Selfhealing DCS nodes using empirical methods to determine when the desired overall network behaviour is achieved. In the remainder of this description, the basic rules of behaviour implemented by each node such that the desired network-level properties are exhibited are described without any further attempt to deal with the overall complexity of events at even a single Tandem node involved in a Selfhealing event. With the detailed signature processing logic of the preferred embodiment described later, the following network properties are achieved.

PROPERTIES OF THE SELFHEALING MECHANISM

Parallelism: The forward-flooding and reverse-linking sequences race in parallel over different routes, limited only by the speed of detection and reaction of the Selfhealing controllers to signatures. Selection of minimum distance paths and correct ordering of reestablished circuits are managed by the SENDER and CHOOSER states executing in the end nodes of the affected span.

Equilibrium Conditions: If 100% coverage is possible for the topology and span provisioning present, then all signatures initiated by the SENDER are eventually matched by complementary signatures from the CHOOSER, or they were rescinded by the SENDER as the needed routes were collected. As equilibrium approaches, DCS machines that are not required in the final restoration pattern soon have no incoming signatures and return to Normal. Those DCS machines with matched forward and complement signatures at their location enter the STABLE-TANDEM STATE and relinquish control to their Operating System, having activated one or more crosspoints. These crosspoints remain closed until the Selfhealing controller is later re-activated by another state change in the signature receiving circuit and finds that the signature anchoring a given crosspoint has now been removed.

If only partial restoration is possible within the given network and MR range, some unsatisfied signature broadcasts persist in the network until a SENDER-timeout clears unmatched signature initiations from the SENDER site, acknowledging that no further restoration is possible. This causes release of all other unmatched signatures in the network and the resultant final state is stable as above except that fewer than 100% of circuits are restored.

Single Circuit Failures: Automatic Protection Switching (APS) subsystems are traditionally provided in transmission systems to protect traffic when a single circuit fails while the cable remains intact. This function is automatically performed by Selfhealing without special considerations. Behaviour is the same as that described above with the addition that in the APS situation there is at least one spare circuit on the same span as the circuit that has failed. Selfhealing always makes preferential use of such circuits, if present. Restoration is very fast in this case because no tandem DCS is involved.

Reporting to Central Control: Immediately after a Selfhealing reaction neither SENDER, CHOOSER nor the central site has knowledge of the new routings synthesized by the network. However, both SENDER and CHOOSER know that through the cooperation of unseen crossconnects, the restored DS-3 entities do have their far ends connected to the desired node, and the emergency is over. Each DCS that was involved reports its participation in a Selfhealing event to its central control site over its telemetry link. Indeed these very telemetry links may now be routed through the restoration path produced by Selfhealing.

In non-critical time, the NOC can then construct and verify a network image of the failed span and the restoration pattern that was deployed by Selfhealing. The NOC can now override or alter the initial realtime restoration pattern for any of its own reasons and dispatch the repair crews. The NOC can also control the subsequent reversion to the repaired circuits by commanding the SENDER node to cancel all restoration signatures or cancel them selectively. Removal of these anchoring signatures by the SENDER briefly re-invokes the Selfhealing controllers at co-operating nodes and the CHOOSER node. These Selfhealing controllers then release the selected crosspoints and return to the Normal state.

An interesting re-use of Selfhealing technology is available to the NOC in the time after the restoration. If the NOC temporarily instructs all DCS machines to disable their Selfhealing controllers, the NOC can then directly control the transmission of audit signatures between DCS machines to verify the logical connectivity (and error performance) of the repairs done by field crews before returning the repaired circuits to service.

Traffic Safety: The above mechanism required no stored knowledge of network topology at any DCS and operated only on spare circuits. Each Selfhealing controller knows only the name of its host node. Selfhealing is therefore insensitive to rearrangements, growth, out-of-service conditions, etc. and is safe from the conventional database consistency problem without resorting to data-locking mechanisms. The real network elements, in their exact configuration at the time of a failure, is the database used by Selfhealing.

DESCRIPTION OF PREFERRED EMBODIMENT

Figure 1B:
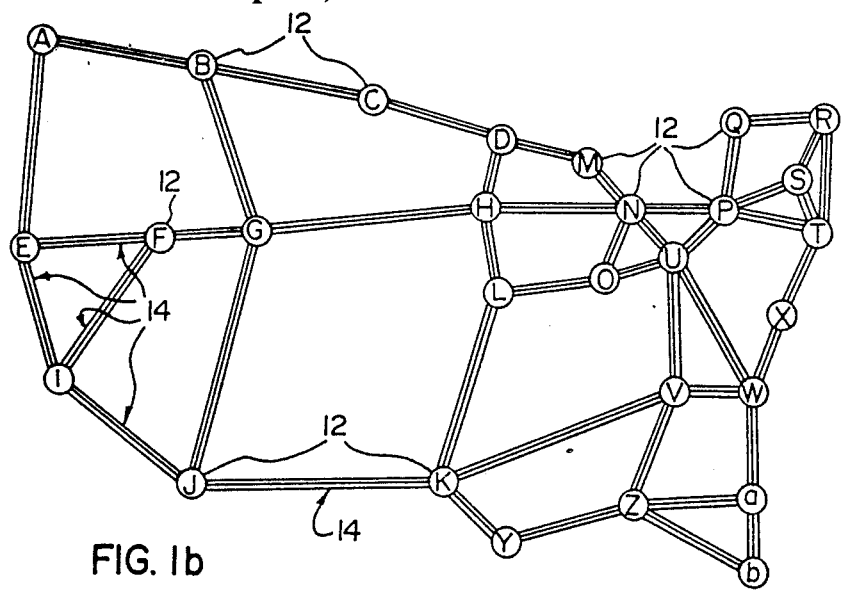
Figure 1C:
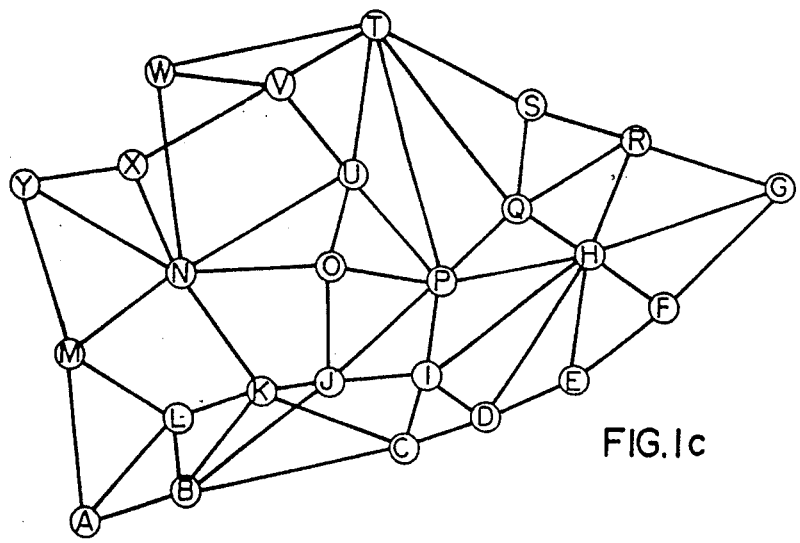

With reference to FIG. 1, the present invention is a method and apparatus for improving the availability (the fraction of all time during which communication can be achieved between any two nodes of the network) of communications in networks, generally designated by numeral 10, such as shown in FIG. 1. Such networks are comprised of an arbitrarily large number of nodes 12 and an arbitrarily large number of spans 14 interconnecting those nodes. Each node is connected by a minimum of two spans (physically separate routes, each having one or more circuits) to other nodes in the network. Each span 14 of such a network is comprised of an even number of unidirectional transmission links 16 and each link is comprised of a traffic-carrying communications payload signal plus a field for the conveyance of a signature as added by this invention. All links are associated into fixed pairs including a receive link 18 and a transmit link 20, one in each direction between the end nodes. Each pair is said to form a circuit between nodes.

The nodes of FIG. 1 are the central offices of the inter-city or inter-office metropolitan telecommunications network. In this context, each "circuit" of the transport network in FIG. 1 is actually a carrier group which corresponds to a large number of individual telephone connections (e.g. 672 at DS-3).

The circuits comprising each span are in one of two possible states called Working or Spare. A WORKING CIRCUIT is one that has been designated for the transmission of actual communications traffic, such as individual telephone calls or 64 Kb/s data connections established by the voice level switching machines in the transmission hierarchy. Conventional telephone switches that handle individual calls are not shown in FIG. 1, only the Digital Crossconnect Switching (DCS) machines of the transport network are shown. The difference between these two is that the voice switches or "traffic switches" set up individual calls through a transport network that is relatively static but whose transmission integrity and sizing to avoid call-blocking at the traffic switches, is managed by the DCS or "transport" switches. A SPARE CIRCUIT is one that is in all transmission terms identical to a working circuit, but is not available for traffic carrying call set-ups by the voice switches, either because it is deliberately set aside for redundancy in the case of failure of a working circuit, or because it is simply present due to the natural provisioning module sizes of transmission equipment. Both of these reasons are common in current telecommunications networks; the latter effect is particularly true in fiber optic networks where the provisioning occurs in very large capacity increments. Economics often dictate installation of a 135 Mb/s (3 DS-3s on one fiber) or even a 565 Mb/s (12 DS-3s on one fiber) system even if only a fraction of the total capacity is required at the time of installation.

The present invention comprises a method and apparatus which is placed at the nodes of a communications network of the type in FIG. 1 in which DIGITAL CROSSCONNECT SWITCHES (DCS) machines are installed at each node of the network. The invention is embodied at the DCS machines where it produces the desired effect that traffic between the nodes A, B, C, D, E, F etc. of the network can be nearly instantaneously restored in the event of a failure of a link or all of the links on a span, by rerouting through distributed switching operations at other nodes of the network, without the need of any centralized or global coordination.

Figure 2:
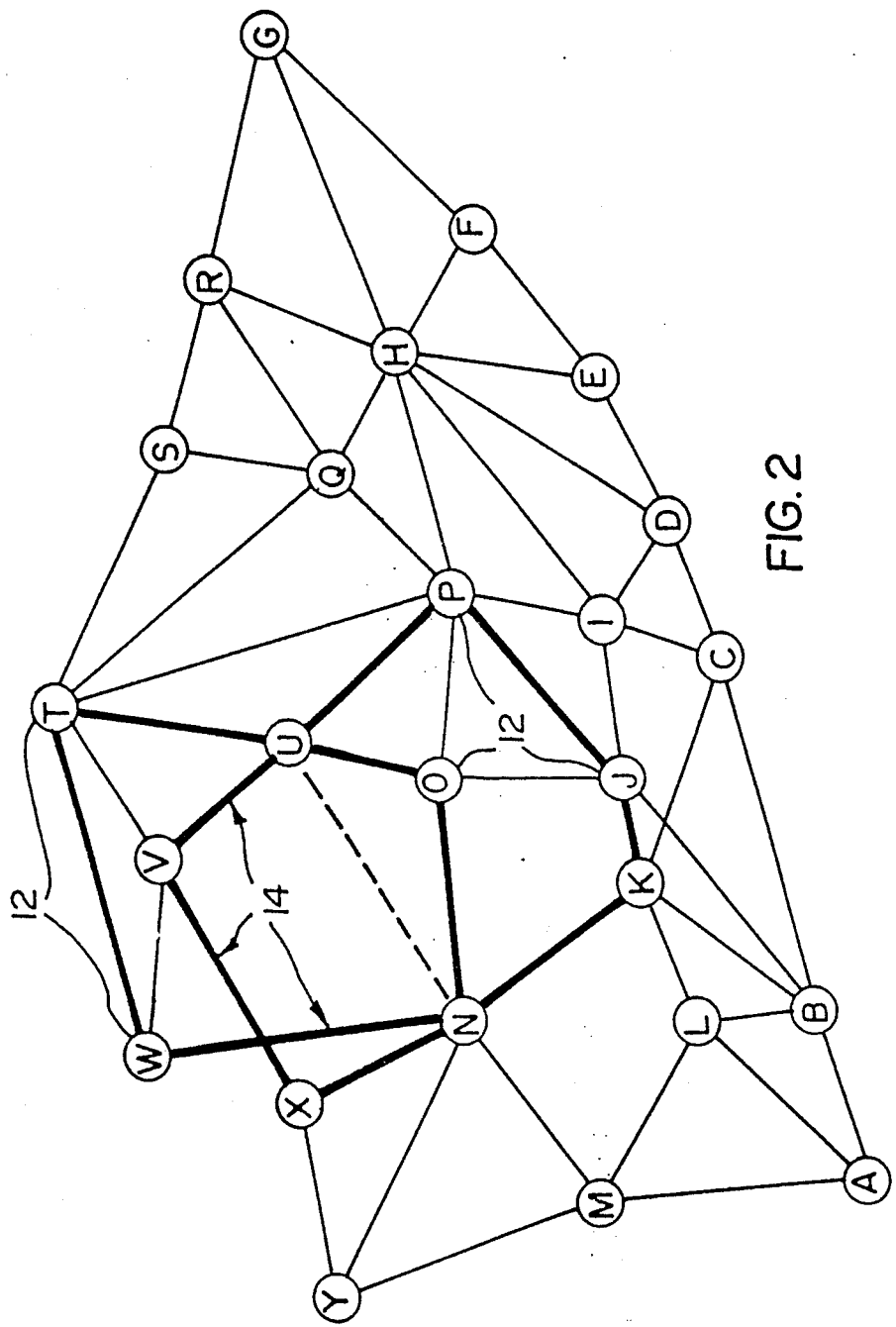
FIG. 2 illustrates one of the example networks of FIG. 1 as having undergone a span cut and shows the general manner in which the present invention achieves distributed self-selected coordination amongst nodes of the network so as to very rapidly restore the traffic affected by the span cut.

FIG. 2 schematically illustrates the form of result that the present invention achieves. In the network of FIG. 2, each node A through X has a DCS machine and embodies the present invention and there happens to be one spare circuit per span. The example shows a span cut severing four working circuits between nodes N and U and shows how nodes X,W,V,T,P,O,J,K were self-selected and coordinated in the completely distributed manner of this invention to provide complete restoration of the four lost circuits between N and U, through the following re-routings outlined in bold: N-W-T-U; N-X-V-U; N-O-U; N-K-J-P-U. In this actual case, restoration was achieved in a total time of 300 milliseconds, as compared to minutes to hours currently anticipated by the industry for centralized telemetry and control of new DCS machines. This is a simple example. Much more complicated re-routings are often obtained involving nodes cooperating in many (not just one as above) of the individual re-routings. Such complicated routings are less obvious to the human eye than the chosen example, but in all cases observed, are the most efficient that could be achieved.

In this description, nodes involved as helpers in the co-operative restoration effort, such as X or W in FIG. 2, are called TANDEM nodes. Nodes affected directly by the span failure are in general called the fault nodes but, as will be seen later, they are treated separately and specifically referred to as SENDER or CHOOSER nodes in the description of the invention.

FIG. 3 expands the view of the DCS machines with modifications required by this invention, placed at every node of the networks in FIGS. 1 and 2. With reference to FIG. 3, it can be seen that the creation of a Selfhealing network requires two additional elements in the crossconnect machines of the network. In FIG. 3, components 30, 32, 34, 36, 38, 40, 42 and 44 comprise the normal general embodiment of a crossconnect machine, for the purposes that are essential here. The dashed outer boundary in FIG. 3 represents nodes. The known crossconnect machine structure is comprised of bi-directional transmission interfaces 30, which are connected to external transmission lines 16, which may be coaxial cable, fiber, or radio, for example, and connected internally to the switching matrix 32 of the DCS via paths 34, 36. The switching matrix is operated by a crosspoint operator means 38 which usually comprises hardware and software. As known in the art, the crossconnect switching matrix and all interface cards are directly monitored and controlled exclusively by the DCS operating system 40 and matrix reconfigurations are only performed through external command and telemetry links by a remote administrative centre often called NOC (Network Operations Center). The current art has no provision for any form of signaling on traffic-carrying transmission signals 16 to be detected and used to control the switching matrix directly.

One aspect of the present invention is that it specifically adds means 50 to detect a specialized form of signaling, called signatures, added transparently to the carrier signals of the network and provides a method for directly reconfiguring the switching matrix, without remote control, in accordance with a certain logical method implemented by the emergency restoration or 'Selfhealing' controller 70.

This invention adds to the known art of crossconnect machines, signature receiving and transmitting circuit means 50 on each transmission interface card 30 and a special independent controller 70 for processing receive signatures, controlling transmit signatures and recognizing signature determined conditions under which the Selfhealing controller will request operation of a specific crosspoint in switching matrix 32 through shared access to the Crosspoint Controller 38.

Figure 4:
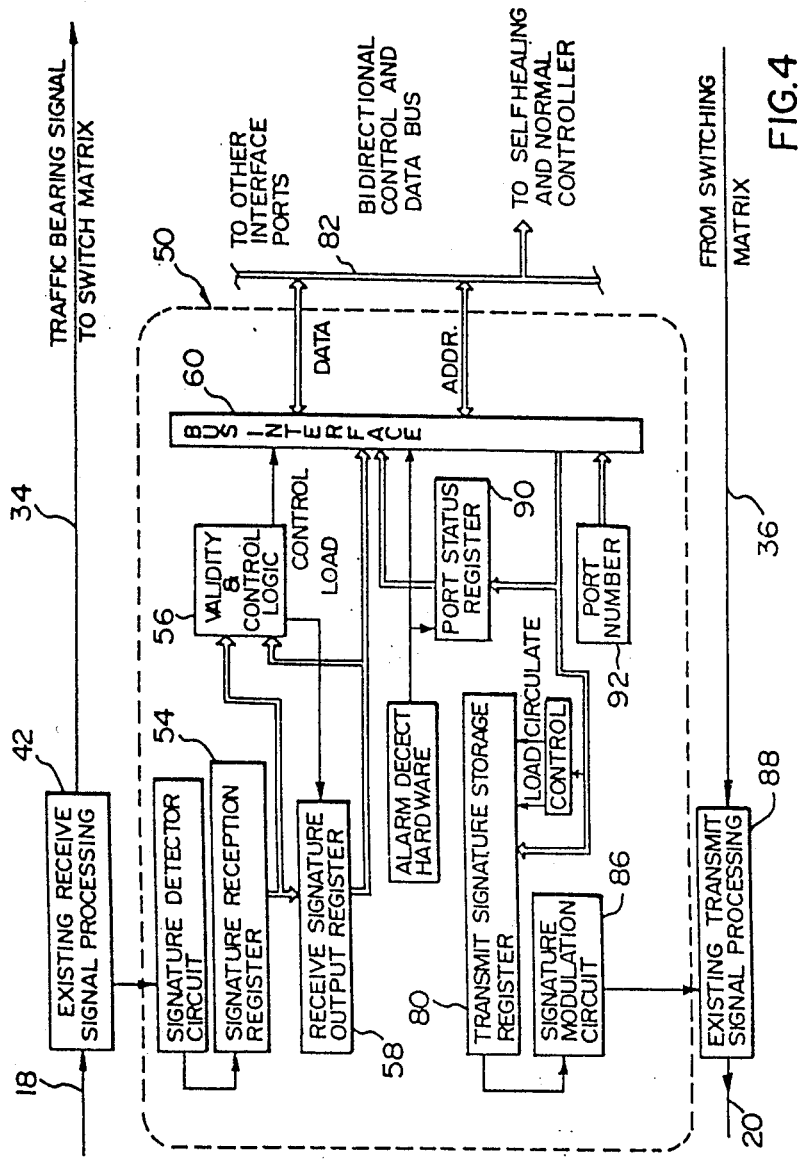
FIG. 4 schematic illustrates signature reception and transmission circuits added by the preferred embodiment of the present invention to each transmission line interface block illustrated in FIG. 3.

FIG. 4 is an expanded view of the signature transmit and receive circuitry shown as 50 in FIG. 3. FIG. 4 is presented for consideration in conjunction with FIG. 5 which details the logical content of the signature receiving and transmitting registers and associated status ports shown only as registers in FIG. 4.

RECEIVE SIGNATURE CIRCUIT FUNCTION

With reference to FIG. 4, the existing receive propagation path 18 and the existing receive signal processing interface card 30 are shown as they were in FIG. 3 and item 50 of FIG. 3 is exploded for closer view. The existing receive signal processing circuitry 42 is connected to the new circuits only in that a copy of the composite signal or a copy containing only the logical binary content of the received traffic signal plus overhead is provided as required to the signature detector circuit 52. Signature detector circuit 52 processes the received signal in a manner such that the particular bits or other attribute(s) of the signal used for transparent conveyance of the signature information is recovered so as to identify the individual signaling elements of the signature on that signal, if any. Two illustrative examples of this process are the following; (a) detection of F-bit pattern errors as in Grover Canadian Patent application Ser. No. 538,090 entitled "Method and Apparatus for Frame-Bit Modulation and Demodulation of the DS-3 Signal" and (b) in the SONET signal format, stripping off the designated signaling overhead bytes. It is within the scope of this invention that any number of schemes for modulation and detection of transparent signature transport methods are possible for implementation of the invention in transport networks using different transport signal formats such as DS-1, DS-3, Syntran, Sonet, or CEPT formats.

Having detected the individual signaling elements of the signature, signature detector circuit 52 feeds its output into a signature reception register 54. Each time a complete and valid signature is recognized by a validity and logic control circuit 56 to be present in the signature reception register 54 and that signature is also seen by the logic control circuit 56 to be different in from the current contents of a signature storage register 58, then the controller 56 will cause the transfer of the newly received signature in signature reception register 54 to receive signature output register 58, where it will stay until another valid but different signature appears on the link 18.

Once the new signature is in the receive signature output register, bus interface 60 connected to Selfhealing logic controller 70 (FIG. 3) raises an internal flag indicating that a new signature has been received and, when appropriate, communicates the signature to the controller over the bus and clears the 'new signature' flag once the controller has read the signature. Thereafter, the signature remains addressable for reference by the controller as may be needed in executing its control logic sequences.

Many means for accomplishing the equivalent peripheral-to-controller transfer function are known including direct connections between each DCS port signature circuit and the controller or there may be a shared interrupt line followed by polling or a vectored interrupt arrangement, etc. In all of these schemes, however, it is an aspect of this invention that the controller needs no memory of its own since all signatures and status data which it needs to implement its function are retained as a distributed memory on each interface port card of the DCS machine. It is an essential aspect, however, that either the controller polls continually for new signatures or each new signature is explicitly brought to the controllers attention by an interrupt because the Selfhealing control logic is implemented as an event-driven finite state machine and events are determined in terms of signature appearances, changes and disappearances (to be described further).

In the preferred embodiment, when bus interface 60 is alerted that a new signature has been received, the bus interface logic completely handles the subsequent transfer of the new signature contents and the identification of the respective DCS interface port along with the status bits to the Selfhealing controller 70 in FIG. 3 by known bus interfacing and transaction techniques.

With reference to FIG. 5, the contents of any valid signature received off a transmission interface are shown and will be discussed in detail. Suffice it to say now that checkbit fields for any number of known error checking and/or error detecting schemes can be appended to the signature data field shown in FIG. 5, and such circuitry would also be provided in signature reception register 54 or control logic 56 of FIG. 4 without changing the nature of this invention.

TRANSMIT SIGNATURE CIRCUIT FUNCTION

The signature receive and transmit circuit 50 includes a transmit signature storage register 80 which can be loaded by Selfhealing controller 70 over bus 82 and bus interface 60. This provides a means by which the Selfhealing controller can apply a desired transmit signature to any desired transmission path 20 as may be appropriate to implement the logic of the Selfhealing method of the present invention embodied in controller 70 in FIG. 3. Through control logic 84, the bus interface can load a new signature into Register 80 and then, once loaded, cause the repeated circulation of the contents of the register so that, by means of a transmit signature modulation circuit 86, the transmit signature in register 80 is indefinitely repeated on the outgoing transmission link 20.

Also shown in FIG. 4 is a Port Status Register 90 which stores certain information used by controller 70 in the preferred embodiment. The contents of the port status register can be read by controller 70 and, in the case of an alarm, the alarm-detection hardware is arranged to activate bus interface 60 to forward the contents portnumber register 92 and port status register 90 to controller 70 without delay. Port status register 90 contains elements 100, 102, 104 and 106 shown in FIG. 5. ALARM 100 (FIG. 5) is a single bit that is set if the corresponding DCS transmission interface experiences a receive loss of signal, a bit error rate degradation, or a loss of timing, etc. or, if external transmission terminal equipment in the same building has detected an alarm on the corresponding channel and this information is connected over to the respective DCS interface port. Those skilled in the art of transmission equipment and interface design will appreciate that there are many techniques and criteria for the rapid determination of loss of transmission integrity. The alarm bit is set by hardware and may be reset by the DCS controller after acknowledgement.

Also present in the Port Status Register is a SPARE bit 102 (FIG. 5). This status bit is written and maintained by DCS operating System 40 under conditions of normal operation. It indicates whether the given port interface is at any given time in traffic-bearing use or is in an equipped-but-idle configuration. If SPARE is true and ALARM is false, then the given transmission interface port is available for use in the Selfhealing method. If SPARE is false (the interface is carrying traffic) and ALARM becomes true, then Selfhealing will work to restore the lost traffic by network rerouting on this and all similar working links affected by the failure event.

The CONNECTED bit 104 is not essential but is a single bit which logs whether this interface port, whether SPARE or not, is actually connected through the matrix to any other interface port forming a path through the DCS machine. If CONNECTED is true, then the field denoted ASSOC-PORT-ID 106 contains the number of the port to which this port is presently connected through the matrix.

If CONNECTED is false, then ASSOC-PORT-ID may either contain a nul indicator or it may store information used by the Selfhealing controller to assist in the faster manipulation of signatures according to the Selfhealing signature processing method to be described. Specifically, when a DCS rebroadcasts a signature arriving on a certain port to a number of other ports as in the forward flooding wave, the ASSOC-PORT- register of each port that is transmitting a rebroadcast signature stores the port number where the precursor signature for these repeated signatures is found. Depending on circumstances, ASSOC-PORT registers and CONNECTED status bits can be written either by the normal DCS or Selfhealing DCS controllers.

CONTENTS OF A SELFHEALING SIGNATURE

The following description refers to FIG. 5. There is only one basic format of restoration signature in this invention, but it is interpreted slightly differently depending on whether it is a "transmit signature" or a "receive signature". Every transmit signature becomes a receive signature at the opposite end of the link on which it is transmitted. Each DCS interface port 30 has provision for one transmit signature and one receive signature. The field NID (Node IDentifier) 110 is written to a transmit signature by the node sending that signature and contains the network-wide identifier of the node originating the signature. This NID field appears in the NID field 120 of the corresponding receive signature at an adjacent node. The NID field is used in Selfhealing so that each DCS machine can recognize the grouping of links arriving at its site into logical spans to the same adjacent node by associating all links with equal receive signature NID fields into a logical span for Selfhealing control logic purposes.

An alternative implementation is to store data at each DCS about the facility spans terminating at its site in which case NID's are not needed. However, the NID-based embodiment is preferred because it is consistent with an objective of the present invention that all information needed by each node to perform Selfhealing comes to that node through the network connections themselves, thereby continually being up-to-date and eliminating the significant practical problems of maintaining accurate real-time distributed network configuration databases at each node.

The other fields in a Selfhealing signature appear both in the transmit and receive signature registers and, although numerically different between transmit and receive sides in any given case, these fields are functionally identical. The SOURCE field of any Tx or Rx signature, 112, 122, respectively, and the corresponding TARGET fields 114, 124 identify either the SENDER or CHOOSER node in a Selfhealing event. SENDER and CHOOSER nodes are the only two nodes which create brand new signatures in the network (TANDEM nodes only rebroadcast and re-index existing primary signatures but never change Source, Target or Index fields). When the SENDER initially floods the network as described earlier, it applies its own network-wide node identifier to the SOURCE field (as well as NID) of each forward flooding signature that it initiates and places the network identifier of the CHOOSER node (the node to which connectivity has been lost, viewed by the SENDER) into the TARGET field. The node identifier of the CHOOSER node is known by the SENDER because this is latched in the NID field of the receive signature register on the working ports that were affected by the span failure (when an alarm occurs, the last valid receive signature is held by the circuit of FIG. 4).

At all other network nodes acting as tandems in the Selfhealing process, SOURCE and TARGET information fields are never altered, but are used by each site to distinguish between possible independent simultaneous failures, i.e., a signature arriving at any third site with a given SOURCE, TARGET pair is uniquely identified as pertaining to one particular fault in the network. Although single isolated faults are the overwhelming case, this feature of the restoration signatures permits Selfhealing to act simultaneously on a number of faults, without hazardous confusion. It should be noted that if only one fault at a time is somehow guaranteed or is the deliberate limitation of the design objective, then SOURCE and TARGET fields can be eliminated and replaced by a single bit that indicates only whether a given signature is "forward" (initiated by SENDER) or "reverse" (initiated by CHOOSER).

When SOURCE and TARGET fields are used, SOURCE becomes the CHOOSER node ID on those signatures initiated (created) by the CHOOSER in response to the forward flooding wave of signatures arriving at its site. As above, the CHOOSER similarly knows the node ID of the node to which it has suffered the connectivity loss, and it writes this node ID into the TARGET field of reverse-linking signatures that are initiated from its site. In summary, therefore, SOURCE and TARGET signature fields serve to separately identify individual simultaneous network faults if they occur and, through the following relations, forward flooding and reverse linking signatures are distinguished (because this is essential for all three Selfhealing states to act correctly) as follows: A forward flooding signature has SOURCE=(SENDER node), TARGET=(CHOOSER node) and a Reverse linking signature, i.e. from the CHOOSER, has SOURCE=(CHOOSER node) and TARGET=(SENDER node).

The INDEX field 116, 126 of a restoration signature is an arbitrary serial number given to each original forward flooding signature initiated by the SENDER node at the commencement of the Selfhealing distributed restoration process. INDEX is never altered by any other node. It will be seen that, in conjunction with the pattern of original signature flooding done by the SENDER and the subsequent reaction to signatures at Tandem nodes, the INDEX field has the effect of managing the complex parallelism of the Selfhealing route-finding method so that independent end-to-end parallel routes are found rather than routes comprised of concentrated parallel and serial segments. Another way to think of the role of INDEX is that the distributed Selfhealing mechanism acts independently, although in parallel, to try to create one complete end-to-end path or no path for each different INDEX value issued by the SENDER. If the number of different INDEX values issued by the SENDER in the original flooding sequence is greater than the number of transmission paths lost and the network is proceeding to synthesize an excess number of paths, the SENDER node simply suspends the excess signature initiations to obtain only those number of paths needed from the network. When a CHOOSER creates a new reverse-linking signature in response to a given forward flooding signature, it uses the INDEX value of the corresponding forward signature.

The remaining signature field, REPEAT 118, 128 provides a mechanism for controlling the range of signature propagation in a Selfhealing action. In the preferred embodiment of the present invention, it is simply an integer value assigned to 1 in any signature when created by SENDER or CHOOSER. Every subsequent Tandem node that sees any signature increments the REPEAT field of the signatures that it may happen to rebroadcast in response to the given incoming signature. No node reacts to any signature arriving with a REPEAT value greater than some limit provided for in the Selfhealing controller logic.

Within the scope of this invention, it is possible to generalize the concept of the REPEAT field in a number of ways to pursue certain desired properties. For instance, the REPEAT field could be made some real-valued and/or nonlinear cost function updated by each Tandem node to achieve low rerouting path delays, to avoid certain portions of the network, to selectively use or avoid certain transmission facilities, etc. Another possibility is to let the REPEAT limit be some function of time after the first signature is seen at a tandem node, so that network behaviour tends to find all shortest routings first and then is allowed to probe successfully longer reroutings if needed if the fault is not fully restored within the local vicinity permitted immediately after the failure.

The description thusfar has focussed on the apparatus of the Selfhealing netWork: Digital Crossconnects, Restoration Signatures, Signature Receiving and Transmitting Circuits and a Selfhealing Controller. It remains now to explain in detail the mechanism (or behaviour rules) of each node in response to various signature events that, when performed simultaneously and independently at each node, causes the network to react with coordinated reroutings of the lost traffic.

To illustrate the detailed mechanisms through which Selfhealing is effected, it will be assumed that a span has been cut between two nodes X and Y in an arbitrary network of nodes and reference will be made to the diagrams in FIGS. 7 to 14 which correspond to this example case. The span cut is assumed to have disrupted three working circuits, causing Selfhealing to seek three re-routings. The signature event-driven sequences at the two end nodes will be considered, initially neglecting how signatures were adjusted and propagated at intervening tandem nodes. In FIGS. 7 to 14, the following notations are used:

TS.field denotes a certain field of the Transmit Signature on a given link;

RS.field denotes a certain field of the receive Signature on a given link;

TS=(. . . ) or RS=(. . . ) is used to enumerate the entire contents of a signature, in the implied order NID, SOURCE, TARGET, INDEX, REPEAT;

"nul" is used to denote a signature or signature field that is in the logically inactive or inapplicable state; and "x" is used to denote a field that may be defined but its exact value is not of significance in the current context.

SENDER-CHOOSER ARBITRATION

SENDER-CHOOSER arbitration pertains to the decision diamond in FIG. 6 labelled "ROLE ARBITRATION". Immediately after the span failure on the transmission facility between X and Y, alarms occur at sites X and Y and the Selfhealing controllers at those sites are given priority over the normal controller. Node X will read the last valid receive signatures on the alarmed ports and see that (from the NID field) node Y is the node to which connectivity is lost. If not all of the alarmed ports show the same NID then we have two or more simultaneous span cuts and this can be treated as two simultaneous faults. Likewise, the Selfhealing controller at node Y is activated and sees that the problem is to find reroutings to node X.

Nodes X and Y each independently perform the SENDER-CHOOSER arbitration and, Y, having higher ordinal rank in the alphabet than X, becomes SENDER and X becomes CHOOSER. These independently determined but mutually compatible choices of SENDER and CHOOSER roles correspond to the SENDER-CHOOSER arbitration block and the SENDER and CHOOSER states shown schematically in FIG. 6.

SENDER FORWARD SIGNATURE FLOODING

Figure 7:
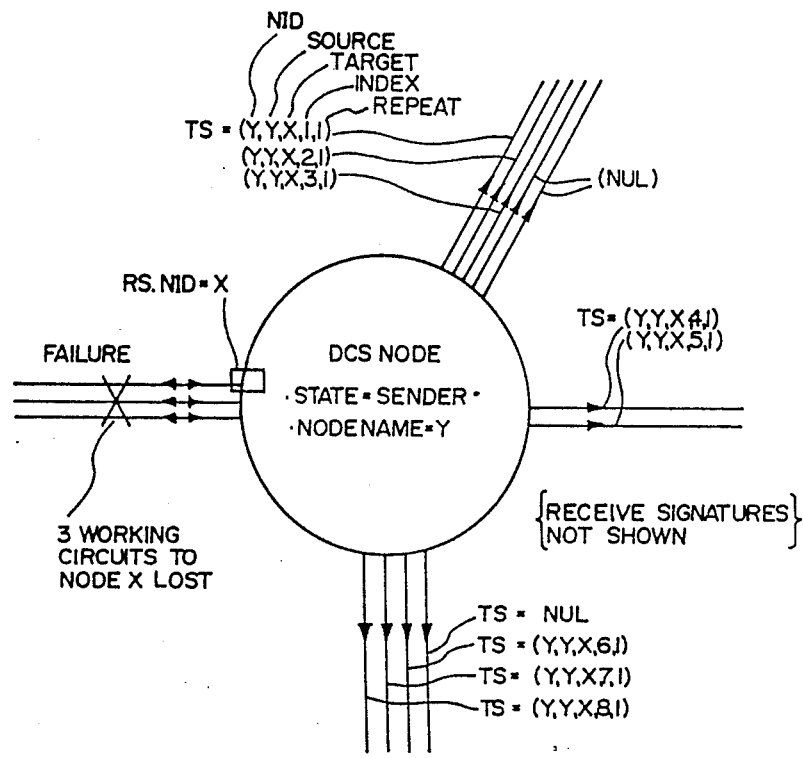

Node Y then commences the forward flooding wave as schematically illustrated in FIG. 7. Using the notation defined above, FIG. 7 illustrates the general manner in which a SENDER node initiates the forward flooding wave of a Selfhealing event. The important things to note are only the RS.NID of the failed working circuits are involved, no other receive signatures apply, the flooding involves transmit signatures on spare links only and each logical span departing from the SENDER site is flooded with signatures up to the minimum of either the number of the circuit restorals needed or the number of spares available on the given span.

Simple flooding of all spares also works, but it is advantageous in overall network restoration speed to perform the slightly more conservative flooding shown in FIG. 7 and described above. It can be shown that the expected restoration coverage is not reduced by restraining the flood according to the above method.

Each forward flooding signature is given the following attributes:

TS.NID=Y (i.e. the name of the SENDER node);

TS.SOURCE=Y (i.e. the name of the SENDER node);

TS.TARGET=X (i.e. the name of the adjacent node suffering the span failure. This is also known as the CHOOSER node in this context);

TS.INDEX=i where i is an arbitrary but unique sequence of integer index values, no two TS's having the same INDEX. In the example of FIG. 5, eight signatures are initiated by node Y, and they are indexed simply as 1 to 8);

TS.REPEAT=1 all originating flood TS's get repeat=1.

CHOOSER REVERSE LINKING SEQUENCE ORIGINATION

If the details of how Tandem nodes react to signatures arriving at their site are temporarily skipped over, except to say in general that they rebroadcast signatures and increase the repeat counts, then, eventually, in any network with sufficient spare links, signatures of the above SOURCE and TARGET pair arrive at the node that adopted the CHOOSER state, Node X in this case, in response to the initial fault and subsequent arbitration based on node ID's. When such a signature arrives at the CHOOSER, FIG. 8 shows the basic manner in which the CHOOSER responds.

Regardless of the RS.NID, if the RS.REPEAT field is less than the repeat limit, the RS.TARGET node is equal to the node ID of the CHOOSER and the RS.SOURCE is equal to the SENDER node to which connectivity has been lost, viewed by the chooser, then the CHOOSER replies by originating a transmit signature that is the complement of the new receive signature, on the transmit side of the same interface port, with TS.INDEX equal to RS.INDEX and TS.NID equal to the node ID of the CHOOSER and TS.REPEAT=1.

Figure 8A:
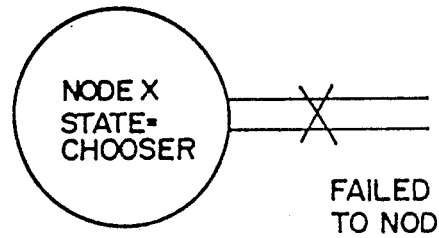
Figure 8B:
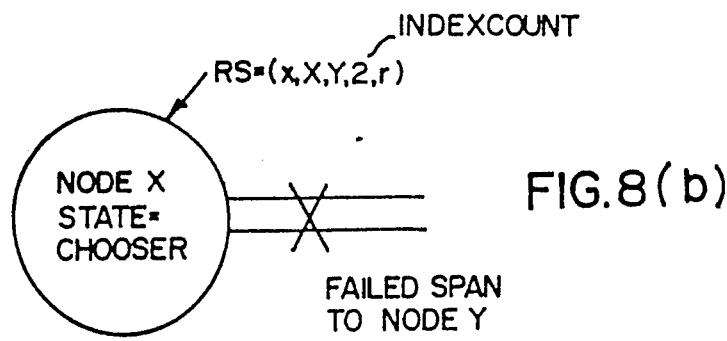
Figure 8C:
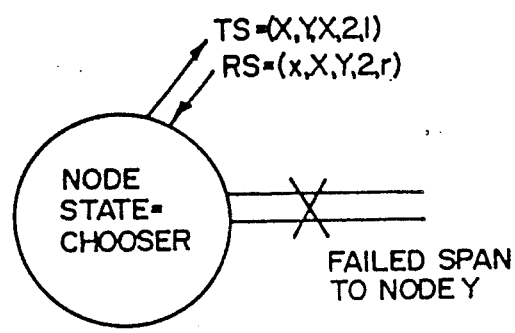

In the example of FIG. 8, RS.INDEX=2. In this case, the CHOOSER will not subsequently respond to any other signatures, on this SOURCE-TARGET pair, that have an INDEX=2, as long as the given receive signature persists. (In some instances, however, it is preferable for the CHOOSER to recognize another receive signature (RS) with the same INDEX if the other RS.REPEAT field is lower, and in such cases to effectively "move" the responding TS to the preferred interface port.)

The CHOOSER node will respond to each signature with correct SOURCE and TARGET fields as described above until the number of responding Transmit signatures is equal to the number of working links cut by the fault, or until no more spare links are available at the CHOOSER site. Because of the action of Tandem nodes, the CHOOSER may see an incoming signature on which it has responded, change its RS.REPEAT field to a smaller value, with no other change in RS fields. The CHOOSER continues to respond with the previously emitted TS in this case.

SENDER REVERSE LINKING SIGNATURE RECOGNITION

Figure 9A:
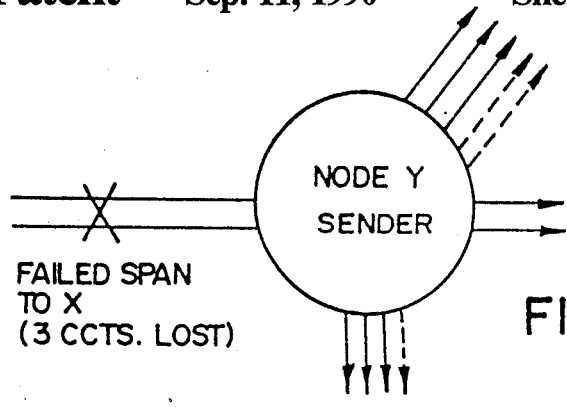
Figure 9B:
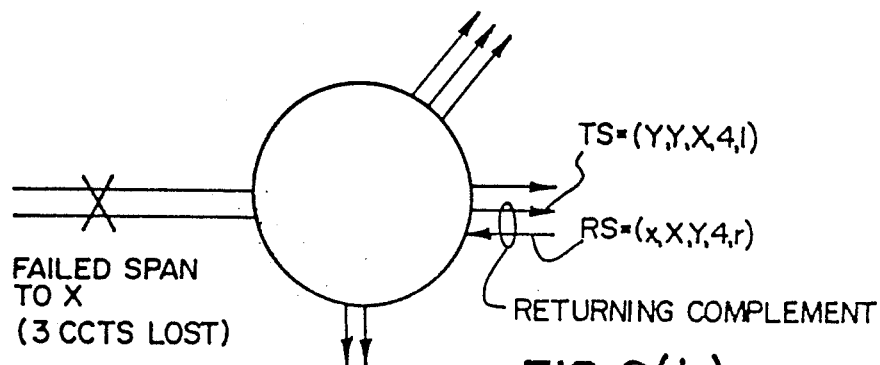

Again deferring treatment of the action of the plurality of Tandem nodes involved in Selfhealing, the basic action of such nodes causes the transmit signatures emitted by the CHOOSER above, in response to forward flooding signatures, to be propagated back to the SENDER node. FIG. 9(a) shows the SENDER node after flooding as in the example of FIG. 7, and FIG. 9(b) shows a receive signature which eventually returns (as a result of a TS at the CHOOSER and the action of Tandem nodes), to the SENDER. It is a property of the Selfhealing method that, through the behaviour of Tandem nodes, any such signature returning to the SENDER will have the complement SOURCE, TARGET pair and the same INDEX as the original TS issued in forward flooding by the SENDER.

Figure 9C:
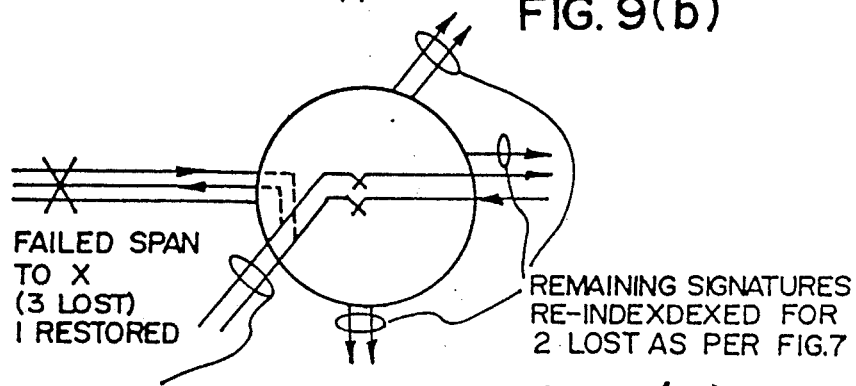

As long as the above conditions are met for the arriving signature at the port on which it arrives, and RS.REPEAT is below the limiting distance criteria, the SENDER will recognize this occurrence as success in an individual path rerouting to the CHOOSER, and the SENDER will immediately operate the appropriate crosspoints to substitute the newly found route through this spare port for one of the ports that was involved in the traffic affecting failure, as shown in FIG. 9(c). Although the SENDER node does not know where the restored traffic signal will be routed through the network, it is the property of this invention that when the above circumstances occur at the SENDER, it is known with certainly that in fact whatever the actual routing, the other end of the new path found is at the CHOOSER and the path involves less that Repeat limit minus 1 other DCS nodes operating in concert to achieve this rerouting (although likewise for them, they have no more knowledge of the overall picture than does the SENDER).

FINAL SIGNAL MAPPING AND MATRIX CONNECTION AT THE CHOOSER

Figure 10A:
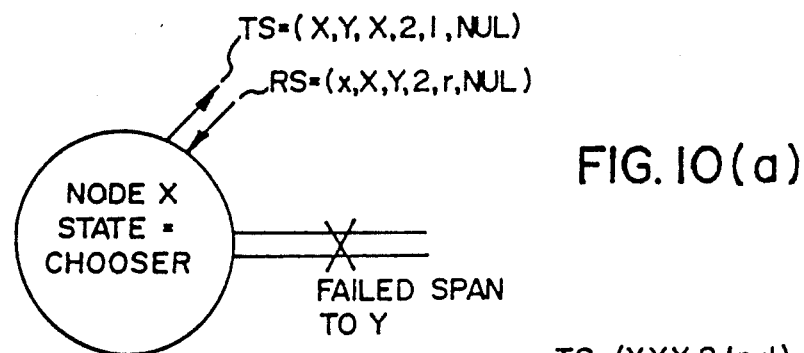
Figure 10B:
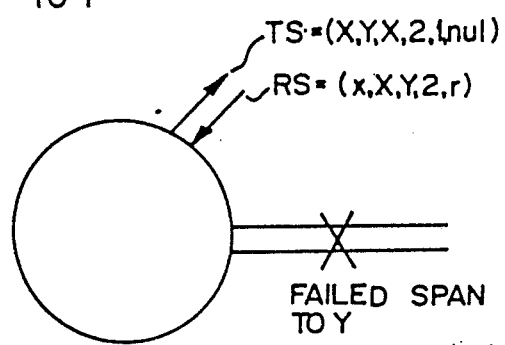
Figure 10C:
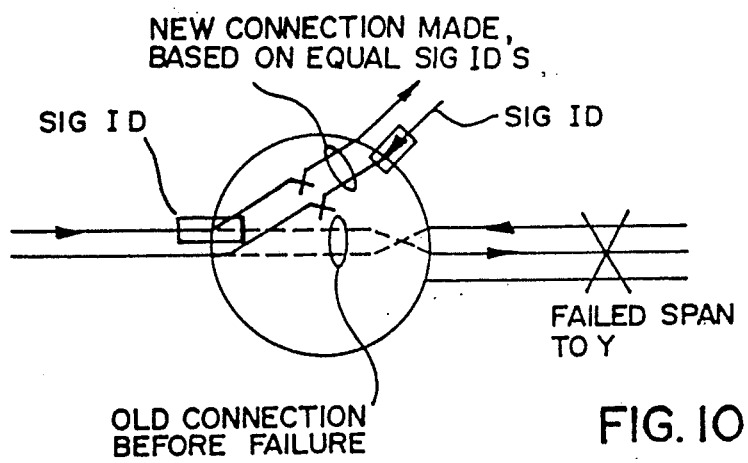

Soon after the SENDER operates the crosspoint as shown in FIG. 9(c), a live traffic signal, carrying signal identifier information, as known in the telecommunications industry, arrives at the CHOOSER site, through the above rerouting path. When this signal arrives at the CHOOSER, the CHOOSER can deduce from the Signal Identifier borne by the carrier signal, which of the possible many ports affected by the span failure, is the correct one to reconnect this signal to through the switch matrix. When this is done, the CHOOSER node operates a crosspoint as shown in FIG. 10, completing the restoration of one traffic carrying signal entity that was disrupted by the fault.

The final stage of mapping signal payloads identically at each end to the new circuit routings found may not be obvious but can be handled in several ways. The problem basically is this: If, say, three links are lost in a span failure between X and Y as in FIG. 7, and the Selfhealing network responds arbitrarily quickly to provide three path reroutings between nodes X and Y through the rest of the network, there still remains the further problem of ensuring that both ends, X and Y, use these three reroutings with the same mapping of failed traffic signal to restoration path number. The following methods can be used to address this last consideration.

In the preferred implementation, every traffic carrier signal such as DS-3 (44.736 Mb/s carrying 672 voice circuits) or a SONET STS-1 (49.992 Mb/s carrying 700 voice circuits) is transparently encoded with a unique network-wide signal identifier. When this is done, the appearance of Signal ID at the CHOOSER, after the SENDER operates its crosspoint, immediately indicates the port to which the CHOOSER should substitute the rerouted signal, because the same Signal ID is seen on the corresponding interface port as in FIG. 10. This arrangement is the most general and works without requiring any prior link numbering convention between DCS nodes.

If all links on a span are assigned some ordering number, known to both DCS nodes on the given span, then the final traffic substitution sequence can simply be performed in the order of assignment on that span. However, this requires the administrative coordination of a link numbering scheme for each span in the network and maintenance of the agreed numbering sequence at both end nodes.

In the special case of a single link failure, this whole consideration is of course unnecessary because there is no final mapping ambiguity.

TANDEM NODE BEHAVIOUR

Reference will now be made to FIGS. 11 TO 14. A node which enters into a Selfhealing restoration event in response to a signature appearance on a spare circuit, as opposed to an alarm on a working circuit, enters the Setup-Tandem state in FIG. 6 and is referred to as a "TANDEM NODE" for purpose of description.

For simplicity of discussion, it will be assumed that all signatures involved have SOURCE=Y, TARGET=X or the complement: SOURCE=X, TARGET=Y. Any signatures arriving at a Tandem node in this example with different SOURCE, TARGET fields either (a) pertain to another simultaneously occurring Selfhealing event, in which case they are processed separately, in the context of their respective faults, or they are simply ignored, or (b) the signature is spurious or erroneous and is ignored. Any signature arriving with RS.REPEAT equal to or greater than the limiting criteria will be ignored and this case will not be discussed further. In addition, any receive signature that is said to be "repeatable", will cause one or a number of new transmit signatures which will be given a repeat count in TS.REPEAT that is the RS.REPEAT of the corresponding RS incremented by one. These rules of repeat limiting and repeat incrementing and SOURCE/TARGET field consistency apply throughout the remaining aspects of the method at the TANDEM node and will not be specifically re-iterated.

Likewise, in all cases, the RS.NID field is used simply to deduce span associations amongst independent links (i.e. all links at a DCS exhibiting RS.NID=K are known to be on the same span or equivalently have the same immediately physically adjacent DCS node destination) and TS.NID is always set to the node ID of the given Tandem node. Therefore, NID fields will also not be explicitly discussed again, although use of RS.NID field is implicit whenever behaviour is described in terms of span oriented knowledge. The above considerations simplify the description of Tandem node behaviour into terms dependent only on the use of the INDEX field and the ASSOC-PORT registers on the DCS interface ports.

Before describing the TANDEM node behaviour, it will be noted that the same node is equally able to act as SENDER or CHOOSER in respect of a span fault adjacent to itself. When it acts as TANDEM node, it is not directly involved in a fault but it is acting on behalf of the two nodes that are involved directly in any given span fault. Although the actions of only one TANDEM node are described here it is implicit that the same behaviour occurs, according to the same principles, simultaneously at any number of other TANDEM nodes to effect selfhealing.

BASIC TANDEM NODE SIGNATURE REBROADCAST

FIG. 11 shows the basic signature rebroadcasting behaviour of a TANDEM node. When a signature is received, its RS.INDEX field is used to first check whether or not the node is already broadcasting any TS signatures with this INDEX. If not, then the rebroadcast pattern shown in FIG. 11 is established. In this pattern of limited signature rebroadcast, one copy of the incoming signature is written to one idle TS register in the set of spare links leaving the node site on each logical span (i.e. one copy of the receive signature with that specific index is sent to each adjacent node reachable from the TANDEM node site). The REPEAT field is incremented and the ASSOC-PORT register of the Transmitting Signature circuit on the selected ports are written with the identification of the port of the incoming signature that caused these transmit signatures.

TANDEM NODE RECOGNITION OF A BETTER PRECURSOR

As the dynamic process of Selfhealing proceeds and the volume of signatures impinging on a given TANDEM node increases through forward flooding, it sometimes occurs that a new signature may appear at a certain port and that signature is a "better" precursor for some existing transmit signatures than the Receive Signature that originally caused those transmit signatures. In this case, the better precursor signature will take over responsibility for the existing transmit signatures for which it is a better precursor. This notion of better precursor and the takeover of existing TS's by association with the better RS port is part of what gives Selfhealing, at the network level, the property of selecting minimum length routes.

Figure 12A:
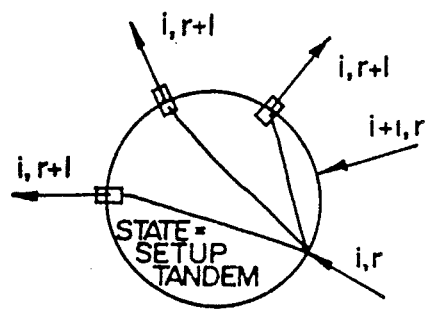
Figure 12B:
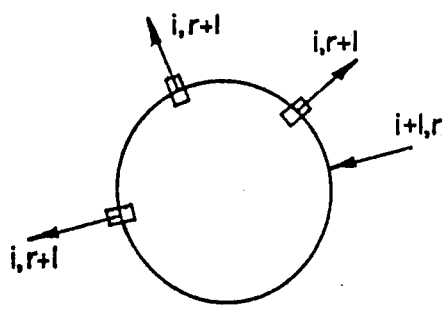
Figure 12C:
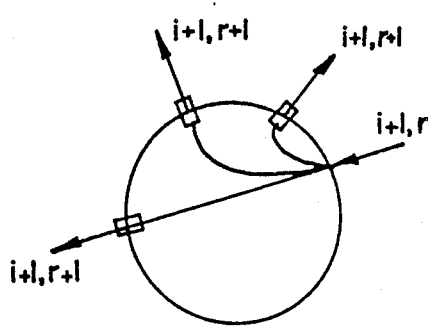

FIG. 12(a) shows three TS's associated (by the dashed lines) with an RS having INDEX 2 and REPEAT r. In FIG. 12(b), an otherwise equivalent signature arrives at a different port with a lower REPEAT field. In FIG. 12(c), the TANDEM node reacts by altering the ASSOC-PORT registers of the relevant transmit signatures to reflect association now with the better signature at the new port. In addition, the TS.REPEAT fields are adjusted to reflect association to a precursor signature with lower repeat count. It will be noted that no crosspoints have been operated yet at the TANDEM node in respect of the current Selfhealing action. The association between TS and RS signatures at the TANDEM node is only a step in the dynamic progression to a situation where the TANDEM node may recognize that a certain crosspoint can be operated to help satisfy a path construction for a certain INDEX number.

TANDEM NODE RECOGNITION OF SIGNATURE COMPLEMENT

Figure 13A:
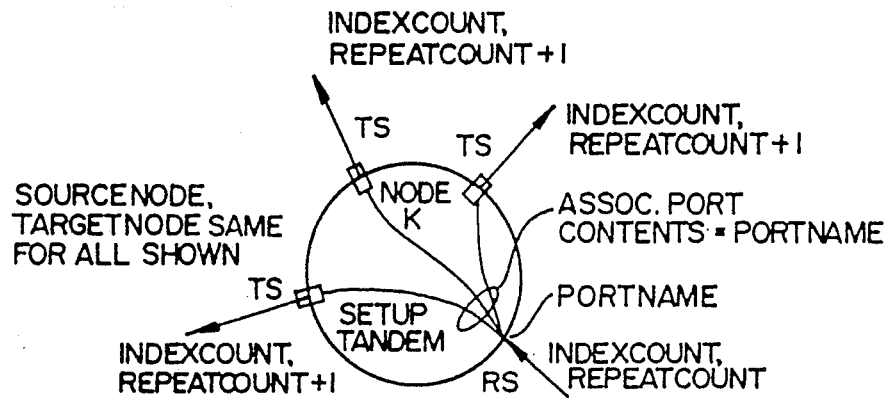
Figure 13B:
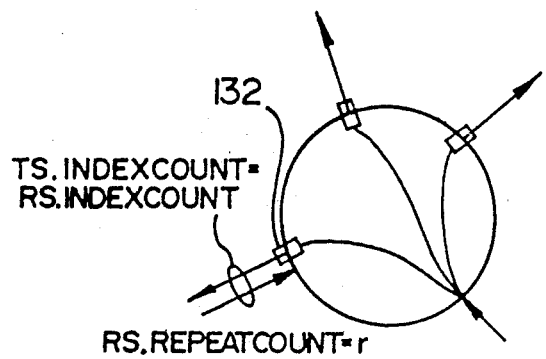

As a result of CHOOSER node Transmit signature initiation in response to forward flooding signature arrival, a TANDEM node adjacent to the CHOOSER node will be the first to see and recognize a "complement signature pair". In FIG. 13(a), a basic TANDEM node rebroadcasting pattern is shown on a given INDEX. As a result of being next to the CHOOSER or as a result of the action of other TANDEM nodes performing the same behaviour as now described for the subject node, it is possible for the subject node to receive a new signature which it recognizes as creating a complement signature pair on the port where the new signature has arrived. The complement signature condition is defined as RS.INDEX=TS.INDEX, RS.SOURCE=TS.TARGET and RS.TARGET=TS.SOURCE. In FIG. 13(b), this is intended to be the case at port 132.

Figure 13C:
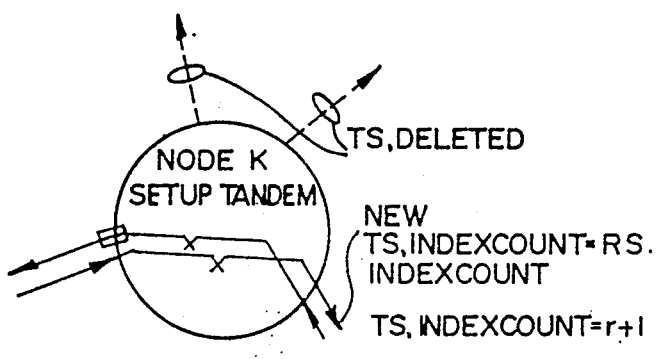
Figure 14A:
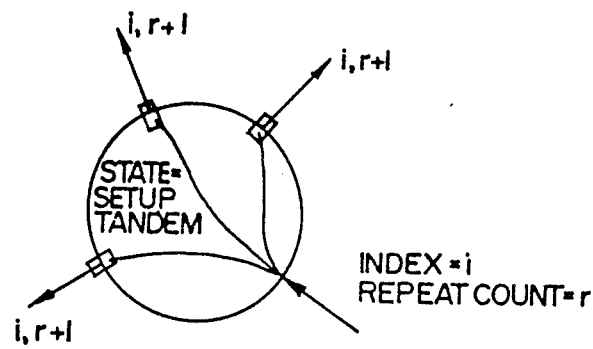
Figure 14B:
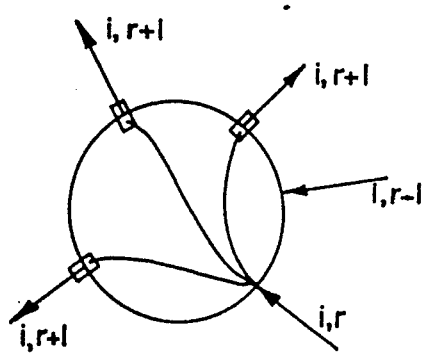
Figure 14C:
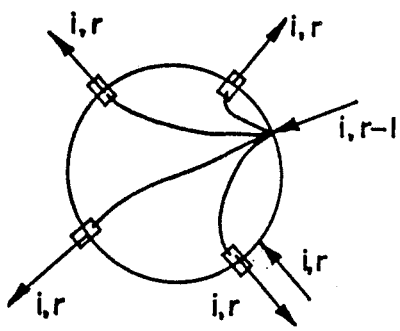

When the above complement signature situation arises, the TANDEM node in this invention then does all of the following immediately, these actions being shown schematically in FIG. 13(c): A matrix crosspoint pair is operated connecting (bi-directionally) the port where the complement-creating receive signature was received to the port identified in the ASSOC-PORT field of the TS half of the port of the new signature; all other transmit signatures associated with the precursor receive signature of the current complement signature port, are suspended and the association register contents are nulled; and a transmit signature is now applied to the transmit half of the port where the precursor receive signature resides. The transmit signature is identical to the receive signature that caused the complement to occur, except that its REPEAT field is incremented.

In summary, when a TANDEM node receives a signature that causes a complement, it prunes off the unneeded branches of the broadcast tree on the given index at its site, extends the path of the complement signature in the one direction where it continues to produce a complement signature, and operates crosspoint connections between the two uniquely identifiable ports involved. In this way, it can be appreciated, at a larger network scale, how the forward flooding process sets up a complex tree of possible routings from all points back to the SENDER, and then how the reverse linking signatures selectively emitted by the CHOOSER cause the actualization of certain of the potential paths, pruning unneeded branches of the tree and reinforcing others by operating crosspoints and selectively propagating the complement condition through TANDEM after TANDEM until the complement signature arrives at the SENDER and the SENDER Reacts as previously described.

Although not shown in FIG. 13(c), when a complement event causes the elimination of certain TS originations, the Selfhealing logic then re-considers all existing RS fields that are not complemented as possible precursors for new TS signatures to be applied to the newly freed TS registers. Therefore, according to the behaviour given for basic signature rebroadcast and better precursor takeover, any TS port freed as a result of a complement on a certain INDEX, may be immediately pressed into use on another persisting INDEX that has not been satisfied.

It is within the scope of this invention that the above mechanism (which is of great complexity when treated fully at a network level, but relatively simple for any one node in isolation) will always, after signature distribution through SENDER flooding and TANDEM rebroadcast, as already described, succeed in propagating the complement condition back to the SENDER node, through a minimum number of TANDEM nodes, once the CHOOSER emits an appropriate reverse-linking signature.

DISAPPEARANCE OF A SIGNATURE AT A TANDEM NODE

One remaining event that can occur at a TANDEM node is the disappearance of signatures or the complete replacement of one signature by another signature with different index count and/or other fields as well. The signature replacement case is handled by the TANDEM node logically the same as a sequence of signature disappearance and new signature appearance. The response to new signatures has been described, so with the following description of response to signature disappearance, the description of isolated signature reaction behaviors will be complete.

Signature disappearance can occur either as the direct or the propagated effect of TS removal at other nodes such as the SENDER, as the required circuit reroutings are obtained, or such as at a TANDEM node that has recognized a signature complement and stemmed off certain TS originations.

The reaction to signature disappearance is fairly simple: when an incoming signature disappears, any transmit signature associated to it (FIG. 12(a)) are simply disconnected from any association and the TS register contents are nulled out (FIG. 12(b)). Immediately thereafter, any other present incoming signature on another index whose rebroadcast pattern could be usefully augmented, is permitted to takeover association responsibility for some or all of those transmit signature registers, as in FIGS. 11 or 12(c), and have the appropriate TS register contents applied to those ports. In general, therefore, when any receive signature disappears, any transmit signature ports that were associated with it form a pool of new idle TS registers to be considered for TS signature application in general by any of the preceding rules given.

APPLICATION TO SELF-PROVISIONING NETWORKS

The mechanism described above can also be employed for automatic provisioning of new circuit routes in a telecommunications network to deal with circumstances of unanticipated traffic load between certain nodes, rather than loss of existing facilities through a failure. This is done by including within the implementation an optional means whereby two nodes anywhere in the network, between which it is desired to provision additional circuit routes, are placed directly into the SENDER and CHOOSER states with regard to an artificial fault between the selected nodes. The artificial fault information includes the number of circuit routings that are being sought. Everything else functions as described above.

Application of this invention in a network such as those in FIGS. 1 and 2 makes it possible for these networks to dynamically and continuously adapt the provisioning of physical circuit routes within the network to the actual time-varying point-to-point traffic loads within the network that are measured statistically by the lower-level call-by-call traffic switches. If, for instance, the voice-call level switch in Toronto were to recognize excess probability of blocking on the circuit group routed to Edmonton (perhaps because of an unpredictable event causing focused overload, such as a tornado), the Toronto and Edmonton DCS machines can be stimulated to perform an artificial Selfhealing event, thereby obtaining additional transmission routings through spare capacity available elsewhere in the network in a time in the order of seconds. When these extra transmission facilities are configured, the view from the telephone traffic switches (call-by-call switches) is thereafter identical except that the logical trunk group sizes on the subject route are suddenly larger in size, thereby adequately reducing the probability of call-blocking on that relation (Edmonton-Toronto, for example). In today's network it can take from days to years, depending on equipment, operating methods and the source of the overload, to recognize traffic loading conditions that are not according to engineering forecasts and to react with the facility changes required to increase physical capacity between affected nodes. It will be noted that this is different from dynamic routing of traffic within fixed size trunk groups, which is known to those skilled in the art of telecommunications.

APPENDIX A
SELFHEALING NETWORK DCS CONTROL PROTOCOL

```
PROGRAM SH_task ;    W. Grover, B. Venables  Sept 4, 1987
CONST    nports        =  [DCS size];
         nxrrepeats    =  [ allowed reach for Selfhealing];
         nxrspansize   =  [largest span at this node]
         nynane        =  [assign network wide ID of this node];
         Setup_timeout =  [Selfhealing time out threshold 2 sec] ;
         Ntce_interval =  [ optional re-execution interval after Setup]

TYPE  nodeid = [enumerated list of valid node names plus a nul value];
      current_states = [Normal, Setup_tandem, Sender, Chooser];
      portids = 1..nports, nul;
      signalids = [ Definition according to network-wide ID scheme,
                    plus a nul value]

RSregister = RECORD
                       NID       :nodeid
                       sourcenode:nodeid;
                       targetnode:nodeid;
                       indexcount:0..nports, nul;
                       repeatcount:0..nxrrepeats+1, nul;
                       alarm, spare, RSdelta, SigIDdelta :boolean;
                       signalID  :signalids
                   END;

TSregister = RECORD
                       NID       :nodeid
                       sourcenode:nodeid;
                       targetnode:nodeid;
                       indexcount:0..nports, nul;
                       repeatcount:0..nxrrepeats+1, nul;
                       assoc_port:portids;
                       signalID  :signalids
                   END;

interrupts = [ valid interrupt vectors in this OS];

VAR   RS: ARRAY [1..nxrports] OF RSregister ;
      TS: ARRAY [1..nxrports] OF TSregister ;
      portname, interrupt_port : portids
      Affected_Ports : array[1..nxrspansize] of portids;
      i, lostccts, restccts : integer;
      SH_interrupt_vector: interrupts;

EXTERNAL
         procedure Load_timer(interval);
         procedure Start_timer;
         procedure Stop_timer;
         mask SigIDdelta(port:portids);
         enable SigIDdelta(port:portids);
         procedure Operate_2way_Crosspoint(port1,port2: portids);
         Procedure Wait_Suspend (SH_interrupt_vector:interrupts,
                                 interrupt_port:portids);
         [suspends SH-task in OS . Will return on next instance of OS
         interrupt_vector = SH_interrupt_vector, with ID of port that
         generated interrupt]

BEGIN   [ one time installation initializations]
for i := 1 to nxrspansize do Affected_Ports[i]:= nul;
FOR i := 1 to nports DO
   BEGIN
      RS[i].source   := nul ;
      RS[i].target   := nul ;
      RS[i].indexcount := nul ;
      RS[i].repeatcount:= nul ;
      RS[i].RSdelta:= false;
      RS[i].SigIDdelta:=false;
      mask_SigIDdelta[i];

TS[i].source   := nul ;
      TS[i].target   := nul ;
      TS[i].indexcount := nul ;
      TS[i].repeatcount:= nul ;
      TS[i].NID := nynane;

[RS[*].alarm is hardware initialiallized & controlled]
[TS[*].assoc_port and TS/RS[*].Signal IDs are written in normal operation by the crosspoint operator process and
 intialized prior to self-healing according to the normal configuration of the crossconnect]
[RS[*].NID arrives on RX direction signal - self-initializing]

END; [for]

REPEAT   [main infinite repeat loop representing interrupt-driven execution]

Wait_Suspend (SH_interrupt_vector, interrupt_port);
```

```
portname := interrupt_port;
CASE state OF
            normal:     NormalNode;
            Sender :    Setup_Sender;
            Chooser:    Setup_Chooser;
            setup_tandem: SetupTandemNode
END; (CASE)
RS[portname].RSdelta:=false;
UNTIL false;
END.

PROCEDURE Check_And_Tidy( Var portno: portids);

BEGIN
    IF RS[portno].spare
        AND ((RS[portno].targetnode()TS[portno].sourcenode)
            OR (RS[portno].indexcount()TS[portno].indexcount)
            OR (RS[portno].sourcenode()TS[portno].targetnode)) THEN
        BEGIN
            TS[portno].targetnode:=nul;
            TS[portno].sourcenode:=nul;
            TS[portno].indexcount:=nul;
            TS[portno].repeatcount:=nul;
            TS[portno].assoc_port:=nul;
        END; (IF)
END; (PROCEDURE Check_And_Tidy)

PROCEDURE SigCOPYFlood (portname);

BEGIN
FOR index:=1 TO nports DO
BEGIN
    IF (RS[index].spare) AND (RS[index].NID()RS[portname].NID)
        AND (TS[index].sourcenode = nul) AND (TS[index].assoc_port = nul)
        AND NOT (RS[index].NID IN AttNode) THEN
    BEGIN
        TS[index].repeatcount:=RS[portname].repeatcount + 1;
        TS[index].targetnode:=RS[portname].targetnode;
        TS[index].sourcenode:=RS[portname].sourcenode;
        TS[index].indexcount:=RS[portname].indexcount;
        TS[index].assoc_port:=portname;
        AttNode:=AttNode + [RS[index].NID];
    END; (IF)
END; (FOR)
END; (Procedure SigCOPYFlood)

PROCEDURE NormalNode;      (normalnode is called when the node has no
                            previous sig coming into it)

TYPE  events=(senderalarm, chooseralarm, repeatable_sig_recieved,
              nonrepeatable_sig_received, spurious);

VAR   AttNode: SET of nodeid ;
      index, index_stamp :integer;
      event:events;

PROCEDURE SigORIGFlood (index_stamp);

BEGIN
AttNode:=[];
FOR index:=1 TO nports DO
BEGIN
    IF (RS[index].spare) AND NOT (RS[index].alarm )
        AND (RS[index].sourcenode = nul)
    THEN BEGIN
        IF NOT (RS[index].NID IN AttNode) THEN
        BEGIN
            TS[index].repeatcount:= 1 ;
            TS[index].targetnode:= RS[portname].NID ;
            TS[index].sourcenode:= myname ;
            TS[index].indexcount:= index_stamp;
            AttNode:=AttNode + [RS[index].NID];
        END; (IF)
    END; (IF)
END; (FOR)
END; (Procedure SigORIGFlood)

PROCEDURE Build_Affected_Ports_Table;

(Scans all DCS ports to find any new alarms on working ports , counts them (lostccts), stores the portnumbers of
the ports these failed facilities were connected to through the matrix and resets the interrupt line RSdelta for
all ports it has found alarmed. )

BEGIN
    lostccts:=0
    FOR index := 1 TO nports DO
    BEGIN
        IF RS[index].alarm AND NOT (RS[index].spare)
            AND (RS[index].RSdelta THEN
        BEGIN
            lostccts = lostccts +1;
            affected_ports[lostccts]:= TS[index].assoc_port
            RS[index].RSdelta := false
        END;
    END
```

```
END;{PROCEDURE Build_Affected_Ports_Table; }
BEGIN  {PROCEDURE NormalMode;}
    {first decide which type of sig is being recieved}
IF ((RS[portname].targetnode=nn]) AND (RS[portname].sourcenode=nnl)
   AND NOT RS[portname].alarm) THEN event::=spurious ELSE IF RS[portname].alarm THEN
      BEGIN
      Build_Affected_Ports_Table;
      restccts:=0;
      IF (myname>RS[portname].NID) THEN event::=senderalarm
                                   ELSE event::=chooseralarm;
      END {ELSE}
      ELSE IF RS[portname].repeatcount<nxrepeats THEN
            event::=repeatable_sig_recieved
            ELSE event::=nonrepeatable_sig_recieved;

{now process the sig according to its type}
CASE event OF spurious:;         {stub } senderalarm:
BEGIN
   FOR index_stamp:=1 to lostccts DO SigORIGflood (index_stamp);
   index_stamp:= 0
   For index := 1 to nports do if
                      (TS[index].sourcenode <> nul) and
                      (TS[index]. indexcount <> nul)
                   then begin
                       index_stamp := index_stamp +1;
                       TS[index].indexcount := index_stamp
                       end;
   state::=sender;
   Start_Timer;
   END {FOR}
END;{senderalarm} chooseralarm:
BEGIN
      state::=setup_restore;
      Start_Timer;
END; {chooseralarm} repeatable_sig_recieved:
BEGIN
   Attnode := {};
   SigCOPYFlood(portname);
   state::=setup_tandem;
END; {repeatable_sig_recieved} nonrepeatable_sig_recieved:
BEGIN
   state:: normal ;
END; {nonrepeatable_sig_recieved}
END; {CASE}
END; {PROCEDURE NormalMode}
PROCEDURE Setup_Sender;

TYPE   events=(Timer_int, Spurious, Return_sig);
VAR    index :integer;
       event:events;

BEGIN {Sender }

IF (timer) THEN event::=timer_int
ELSE IF NOT (RS[portname].RSdelta) THEN event::=Spurious
ELSE IF (RS[portname].targetnode=myname) THEN event::=Return_sig;
ELSE event::=Spurious;

CASE event OF timer_int :
   BEGIN
   FOR index:=1 TO nports DO Check_and_tidy(index)
       state::=Sender ;
       Stop_timer ;
       Load_timer(ntce_interval) ;
       Start_timer;
   END; {timer_int } spurious:;         {stub} return_sig:
   BEGIN
   {1st confirm that the returning sig is a complement.
    If so, operate crosspoint to substitute traffic forwarding traffic (and SigID) to the Chooser }
       IF (RS[portname].sourcename = TS[portname].targetnode)
          AND (RS[portname].indexcount = TS[portname].indexcount)
          THEN BEGIN
             restccts:=restccts+1;
             Operate Cross Point(Affected_ports[restccts],portname);
             { TS[portname].SigID := RS[Affected_ports[restccts]].SigID;}
```

```
{ forwarding of SigID is implicit with operation of the crosspoint}
        IF (lostccts = restccts) THEN
            BEGIN
                FOR index:=1 TO nports DO Check_and_tidy(index)
                state:= Sender;
                Stop_timer ;
                Load_timer(atcc_interval);
            END; {IF}
        ELSE state:=Sender;
        END;
    END; {return_sig}
END; {CASE}
END; {PROCEDURE Setup_Sender;}

PROCEDURE Setup_Chooser;

TYPE    events=(new_forward_sig,sigid_arrive, Spurious );
VAR     index :integer;
        index_satisfied:boolean;
        event:events;

BEGIN {Setup_Chooser}
    {check to see what type of sig is coming in}
    IF RS[portname].targetnode=myname THEN event:= Spurious
    ELSE IF (RS[portname].sigID=0) THEN event:= new_forward_sig
    ELSE IF (RS[portname].SigIDdelta) THEN event:=SigID_arrive
    ELSE event:= Spurious ;

{now process the sig according to its type}
    CASE event OF

Spurious : BEGIN
                Check_And_Tidy(portname);
                state:= chooser;
            END;

new_forward_sig:
        BEGIN
            IF restccts<lostccts THEN
                BEGIN
                    index_satisfied:=false;
                    index:=0;
                    REPEAT
                        index:=index+1 ;
                        IF(TS[index].indexcount = RS[portname].indexcount))
                            THEN index_satisfied:=true;
                    UNTIL (index=nports) OR index_satisfied;
                    IF NOT index_satisfied THEN
                        BEGIN
                            TS[portname].targetnode:=RS[portname].sourcenode;
                            TS[portname].sourcenode:=RS[portname].targetnode;
                            TS[portname].indexcount:=RS[portname].indexcount;
                            TS[portname].repeatcount:=1;
                            TS[portname].assoc_port:=portname;
                            Enable SigIDdelta[portname]
{enable the signal ID interrupt on this port so Chooser will be invoked when the Sender operates crosspoint
forwarding traffic, so we can operate our crosspoint to knit back the corresponding sigID}
                            restccts:=restccts+1;
                        END; {IF}
                END; {IF}
            state:=Chooser;
{will stay in Chooser even if restccts = lostccts until final signalID mapping is completed}
        END;{forward_sig}

Sigid_Arrive: {signalID change caused the interrupt Chooser will operate
                    a crosspoint here}
        BEGIN
            index:=0;
            REPEAT
                index:=index+1;
            UNTIL RS[affected_ports[index]].sigID=RS[portname].sigID;
            Operate_2Way_CrossPoint(affected_ports[index],portname);
            Affected_ports[index]:=nul;
            Mask SigIDdelta[portname]
        END {SigID_Arrive}

END; {CASE}
END; {PROCEDURE Setup_Chooser}

PROCEDURE SetupTandemMode;

TYPE    events=(no_sig, spurious, sig_vanished, new_complement_sig,
            repeatable_sig, nonrepeatable_sig);

VAR     AltMode: SET of nodeid;
        index:integer;
        involved, differentsig: boolean;
        event:events;

FUNCTION BetterSig(portname);
{Looks to see if an incoming sig on portname is the best of its kind coming in for a given indexcount
and source-target relation. An incoming signature with a lower repeatcount or already complemented is
considered better and will not be disrupted. }
```

```
BEGIN
    BetterSig:=false;
    index:=0;
    REPEAT    {compare current RXsig on portname against all other ports}
        index:=index+1;
        IF RS[index].spare
            AND ((((RS[index].indexcount = RS[portname].indexcount)
                    AND (RS[index].sourcenode = RS[portname].sourcenode)
                    AND (index<>portname)
                    AND (RS[index].targetnode= RS[portname].targetnode)
                    AND (RS[index].repeatcount<= RS[portname].repeatcount))
                OR ((TS[index].indexcount=RS[index].indexcount)
                    AND (TS[index].sourcenode=RS[index].targetnode)
                    AND (TS[index].targetnode=RS[index].sourcenode)))
        THEN BetterSig:=true;
    UNTIL (index=nports) OR BetterSig;
END; {Better_Sig_Search}

PROCEDURE Cancel_TX_Sigs_From (port, portname);
{cancels TXsigs stemming from one RXsig that has disappeared or been
overwritten. Uses associated port field of TS register to quickly identify TXsigs that
were caused by the RS at portname. The scan of all ports is used as an opportunity
to see if their remains any signature activity at this node. If not, involved will go
false and cause a return to Normal state }
BEGIN
    involved:=false;
    FOR index:=1 TO nports DO
    BEGIN
        IF TS[index].spare AND (TS[index].assoc_port=port)
            AND (index <> portname)THEN
        BEGIN
            TS[index].sourcenode:=nul;
            TS[index].targetnode:=nul;
            TS[index].repeatcount:=nul;
            TS[index].indexcount:=nul;
            TS[index].assoc_port:=nul;
        END; {IF}
        IF ((TS[index].sourcenode<>nul)
            OR (RS[index].sourcenode<>nul)) THEN involved:=true;
    END; {FOR}
END; {CancelTXSigs}

Procedure Update_Sending_to_set (indexcount);
{builds set of nodeids to which this node is currently sending
signatures on a given indexcount. This set used to manage signature
rebroadcasting }
BEGIN
    AttNode := [];
    FOR index:=1 TO nports DO
    BEGIN
        IF (TS[index].sourcenode=RS[portname].sourcenode)
            AND (TS[index].targetnode=RS[portname].targetnode)
            AND (TS[index].indexcount=RS[portname].indexcount) THEN
        BEGIN
            AttNode := AttNode + [RS[index].NID];
            {take this opportunity to take over outgoing signatures
             for which I am actually a better predecessor}
            IF ((TS[index].repeatcount>RS[portname].repeatcount+1)
                AND (RS[index].NID<>RS[portname].NID)) THEN
            BEGIN
                TS[index].repeatcount:=RS[portname].repeatcount+1;
                TS[index].assoc_port:=portname;
            END;
        END;
    END; {FOR}
END; {Update_Sending_to_set}

BEGIN {SetupTandemMode}
{A receive signature on a port has changed and the SH task was in Setup-Tandem state.
We arrive here with portname set equal to the port where this change occurred.}

REPEAT   { The highest level here is a loop that causes processing of EVERY ports RS
in a (modulo nports) sequence starting from the current PORTNAME : ie) the port on
which the RS delta that caused an interrupt was seen.}

{EVENT PARSING TREE......}
    involved:=true;
    IF RS[portname].RSdelta THEN differentsig:=true
                            ELSE differentsig:=false;

IF (RS[portname].targetnode=nul) AND (RS[portname].sourcenode=nul)
    THEN BEGIN IF differentsig THEN event:= sig_vanish
                               ELSE event := no_sig;
    ELSE{1}
    BEGIN             {check for a complement sig incoming}
        IF (RS[portname].sourcenode= TS[portname].targetnode)
            AND (RS[portname].targetnode= TS[portname].sourcenode)
            AND (RS[portname].indexcount= TS[portname].indexcount)
        THEN BEGIN {sig on portname is a complement }
            IF differentsig THEN event:=new_complement_sig
                            ELSE event:=nonrepeatable_sig;
            END
        ELSE{2} BEGIN
            IF differentsig THEN Cancel_TX_Sigs_from (portname,portname);
            IF BetterSig THEN event:=nonrepeatable_sig
            ELSE IF (RS[portname].repeatcount<maxrepeats) THEN
```

```
              event::=repeatable_sig
      ELSE event::=nonrepeatable_sig;
      END; [ELSE2]
  END; [ELSE1]
  [END OF EVENT PARSING TREE]

CASE event OF spurious: ; [stub]

sig_vanish:  BEGIN
                 Cancel TX Sigs From (portname,portname);
                 IF NOT involved THEN state::=normal;
               END; [sig_vanish]

complement_sig:  [propagate the incoming sig in the direction of its complement]
               BEGIN
                 Cancel TX Sigs From (portname,portname);
                 index:=TS[portname].assoc_port;
                 Cancel TX Sigs From (index, portname);
                 TS[index].targetnode:=RS[portname].targetnode;
                 TS[index].sourcenode:=RS[portname].sourcenode;
                 TS[index].repeatcount:=RS[portname].repeatcount + 1;
                 TS[index].indexcount:=RS[portname].indexcount;
                 Operate Xmt Crosspoint(portname,index);
                 state::= setup_tandem_node; [assign next state]
               END; [complement_sig]

repeatable_sig:
  [send the sig down all clear outgoing links which have not already been used,
   not two to any one node and none to the node the RS is from]
               BEGIN
                 Update Sending_to Set;
                 SigCOPYflood (portname);
               END; [repeatable_sig_received]

nonrepeatable_sig_received:;    state::= setup_tandem
  END; [CASE]

portname := succ(portname);    [modulo wrap succ function]
  UNTIL portname = interrupt_port;

END; [SetupTandemNode]
```

The embodiments of the invention in which an exclusive property or privilege is claimed are defined as follows:

1. A method of restoring communications between a pair of nodes in a network having an arbitrary number of nodes and an arbitrary number of spans interconnecting said nodes, each said span having working circuits between nodes designated for transmitting actual communications traffic and spare circuits between nodes capable of, but not designated for, transmitting actual communications traffic, said method comprising the steps of:
   (a) establishing one or more independent communication paths between said pair of nodes through a series of spare circuits of spans interconnecting said pair of nodes and other interconnected nodes in said network, including the steps of:
      i. repeatedly transmitting restoration signals along logical spans of spare circuits departing said one node;
      ii. repeatedly retransmitting said restoration signals from said other interconnected nodes along logical spans of spare circuits departing said interconnected nodes; and
      iii. upon receipt of a restoration signal by said other node, transmitting a complement restoration signal from said other node along a path consisting of the same spare circuits along which said restoration signal was communicated to said other node; and
   (b) redirecting communications traffic intended for one or more failed spans interconnecting said pair of nodes through one or more of said paths.

2. A method as defined in claim 1, including the step of identifying spare circuits at said one node and allocating a distinct restoration signal to each identified spare circuit.

3. A method as defined in claim 1, wherein said repeatedly transmitting step includes repeatedly transmitting said signals along each logical span of spare circuits departing said one node up to the minimum of either the number of circuit restorations required or the number of spare circuits available to said one node.

4. A method as defined in claim 1, further including the step of continuing to respond, at said other node of said pair of nodes, to restoration signals until the number complement restoration signals equals the number of failed working circuits or until no more spare circuits are available at said other node of said pair of nodes.

5. A method as defined in claim 1, each said restoration signal and its complement restoration signal including an attribute representative of a particular one of said paths.

6. A method as defined in claim 1, each said signal including an attribute representative of the number of spans and/or linking nodes in each said path at any given point along said path.

7. A method as defined in claim 1, each said restoration signal and its complement restoration signal including a first attribute representative of a particular one of said paths and a second attribute representative of the number of spans and/or linking nodes in each said path at any given point along said path.

8. A method as defined in claim 7, each said restoration signal and its complement restoration signal including third and fourth attributes identifying said one and said other of said pair of nodes.

9. A method as defined in claim 8, each said restoration signal and its complement restoration signal including a fifth attribute representative of a network-wide identification of the node originating said signals.

10. A method as defined in claim 1, further including the step of:
   (a) designating one of said nodes as a SENDER node from which said restoration signals will originate and the other of said pair of nodes as a CHOOSER from which said complement restoration signals will originate.

11. A method as defined in claim 10, wherein said designating step being on the basis of an ordinal test.

12. A method of restoring communications between a pair of nodes in a network having an arbitrary number of nodes and an arbitrary number of spans interconnecting said nodes, each said span having working circuits between nodes designated for transmitting actual communications traffic and spare circuits between nodes capable of, but not designated for, transmitting actual communications traffic, said method comprising the steps of:
  (a) designating one of said nodes of said pair of nodes as a SENDER node and the other of said pair of nodes as a CHOOSER node;
  (b) establishing one or more independent communication paths between said SENDER node and said CHOOSER node through a series of spare circuits of spans interconnecting said SENDER and CHOOSER nodes with other nodes in said network, including the steps of:
    i. repeatedly transmitting restoration signals along each logical span of spare circuits departing said SENDER node up to the minimum of either the number of circuit restorations required or the number of spare circuits available to said SENDER node;
    ii. repeatedly retransmitting said restoration signals from said other nodes along each logical span of spare circuits departing said other nodes;
    iii. upon receipt of a restoration signal by said other node, transmitting a complement restoration signal from said CHOOSER node along the logical span of the spare circuit upon which said restoration signal was received;
    iv. retransmitting said complement restoration signals from said other nodes along the logical span of the spare circuits on which said restoration was received and connecting the port upon which said restoration signal was received with the port upon which said complement restoration signal was received whereby to permit communications traffic therebetween;
  each said restoration signal and its complement restoration signal including a first attribute representative of a network-wide identification of the node originating said signals, a second attribute identifying either said SENDER node or said CHOOSER node as a SOURCE node, a third attribute identifying either said CHOOSER node or said SENDER node as a TARGET node, a fourth attribute representative of a particular one of said paths, and a fifth, incrementable attribute representative of the number of spans and/or linking nodes in each said path at any given point along said path; and
  (c) redirecting, through one or more of said paths, communications traffic received at input ports of each of said SENDER and CHOOSER nodes and intended for transmission through one or more failed spans interconnecting said SENDER and CHOOSER nodes.

13. A method as defined in claim 12, including the step of identifying spare circuits at said one node and allocating a distinct restoration signal to each identified spare circuit.

14. A method as defined in claim 13, wherein said restoration signals transmitted along said spare circuits departing said SENDER node differ from one another only by the value of said fourth attribute.

15. A method as defined in claim 13, wherein said retransmitting steps including the step of incrementing said fifth attribute of received signals prior to retransmitting said signals.

16. A method as defined in claim 13, further including the step of rejecting at either said other nodes or said CHOOSER node any received signal whose fifth attribute exceeds a predetermined value.

17. A method as defined in claim 13, storing at each other node the first received restoration signal with a particular fourth attribute and rejecting any other received restoration signals having said particular fourth attribute.

18. A method as defined in claim 13, storing at each other node the first received restoration with a particular fourth attribute, rejecting any other received restoration having the same first to fourth attributes but a larger fifth attribute and replacing said stored signal with any new restoration signal having the same first to fourth attributes but a smaller fifth attribute.

19. A method of restoring communications between a pair of nodes, between which communications have been broken, in a network having an arbitrary number of nodes and an arbitrary number of spans interconnecting said nodes, each said span having working circuits between nodes designated for transmitting actual communications traffic and spare circuits between nodes capable of but, not designated for, the transmission of actual communications traffic, said method comprising the steps of:
  (a) upon occurrence of a communication failure in one or more circuits in one or more spans between said pair of nodes, designating one of said pair of nodes a SENDER node and the other of said pair of nodes a CHOOSER node;
  (b) repeatedly transmitting restoration signals on the outgoing transmission link of one or more spare circuits departing from said SENDER node, each said restoration signal including the identity of said SENDER node, the identity of said CHOOSER node, an INDEX value representative of the identity of a complete, independent route between said SENDER and said CHOOSER nodes starting at the spare circuit departing said SENDER node along which said signal is transmitted, and a predetermined initial REPEAT value;
  (c) upon receipt of one of said restoration signals at a TANDEM node:
    i. determining whether said TANDEM node is already transmitting a restoration signal having the same INDEX value as the just received restoration signal;
    ii. ignoring any restoration signal having the same INDEX value as that of a signal said node is already transmitting;
    iii. if said node is not already transmitting a restoration signal having the same INDEX value, producing a modified restoration signal by incrementing said repeat value of said restoration signal and repeatedly transmitting said modified restoration signal along spare links departing said TANDEM node;

(d) upon receipt of a modified restoration signal at said CHOOSER node, repeatedly transmitting a complement restoration signal from said CHOOSER node back through the same spare circuit along which said modified restoration signature was received, said restoration signal including the identity of said CHOOSER node, an INDEX value equal to the INDEX value of said modified restoration signal, and a predetermined initial REPEAT value;

(e) upon receipt of a complement restoration signal at a TANDEM node:
  i. operatively connecting the port upon which said complement restoration signal was received with the port on which its corresponding restoration signal was received whereby to permit communications traffic therebetween; and
  ii. incrementing the repeat value of said complement restoration signal and transmitting the modified complement restoration signal back through the spare circuit along which said corresponding restoration signal was received; and (f) upon receipt of a modified complement restoration signal at said SENDER node, operatively connecting the port containing communications traffic intended for one of said failed circuits to the port on which said modified complement signature was received.

20. A method as defined in claim 19, including the step of identifying spare circuits at said one node and allocating a distinct restoration signal to each identified spare circuit.

21. A method as defined in claim 20, wherein said step of designating one of said pair of nodes a SENDER node and the other of said pair of nodes a CHOOSER node being on the basis of an ordinal test conducted independently at each said SENDER and CHOOSER nodes.

22. A method as defined in claim 21, further including the step of storing, at each said SENDER, TANDEM and CHOOSER nodes, received and transmitted signals in respective received and transmitted signal storage registers and the identity of the port of upon which each said signals was received and transmitted.

23. A method as defined in claim 22, wherein step (c) further includes the step of ignoring any restoration signal whose REPEAT value is greater than a predetermined value.

24. A method as defined in claim 23, wherein step (d) further includes the step of ignoring any modified restoration signal whose REPEAT value is greater than a predetermined value.

25. A method as defined in claim 24, wherein step (c)(ii) further includes the steps of ignoring a restoration signal having the same INDEX value and the same or greater REPEAT value as that of any restoration signal said node is already transmitting and substituting a restoration signal having the same INDEX value and a smaller REPEAT value as that of any restoration signal said node is already transmitting.

26. A method as defined in claim 25, step (e) further including the step of suspending transmission of all modified restoration signals having the same INDEX value as that of said received complement restoration signal.

27. A method as defined in claim 26, each said signal further including a Node Identifier field for identifying the node originating a signal.

28. A method as defined in claim 27, further including the step of encoding said restoration and complement restoration signals into a communications traffic signal.

29. An apparatus for restoring communications between a pair of nodes in a network having an arbitrary number of nodes and an arbitrary number of spans interconnecting said nodes, each said span having working circuits between nodes designated for transmitting actual communications traffic and spare circuits between nodes capable of, but not designated, for transmitting actual communications traffic, said apparatus comprising:
  (a) means for establishing one or more independent communication paths between said pair of nodes through a series of spare circuits of spans interconnecting said pair of nodes and other interconnected nodes in said network, said establishing means including:
    i. means for repeatedly transmitting restoration signals along logical spans of spare circuits departing said one node;
    ii. means for repeatedly retransmitting said restoration signals from said other interconnected nodes along logical spans of spare circuits departing said interconnected nodes; and
    iii. means at said other node responsive to receipt of a restoration signal thereat for transmitting a complement restoration signal from said other node along a path consisting of the same spare circuits along which said restoration signal was communicated to said other node; and
  (b) means for redirecting communications traffic intended for one or more failed spans interconnecting said pair of nodes through one or more of said paths.

30. An apparatus as defined in claim 29, further including means for identifying spare circuits at said one node and allocating a distinct restoration signal to each identified spare circuit.

31. An apparatus as defined in claim 30, said transmitting means including means for transparently modulating said signals into communications traffic signals travelling between nodes of said network.

32. An apparatus as defined in claim 29, said repeatedly transmitting means being operable for repeatedly transmitting said signals along each logical span of spare circuits departing said one node up to the minimum of either the number of circuit restorations required or the number of spare circuits available to said one node.

33. An apparatus as defined in claim 29, said complement signal transmitting means being operable to respond to restoration signals until the number complement restoration signals equals the number of failed working circuits or until no more spare circuits are available at said other node of said pair of nodes.

34. An apparatus as defined in claim 29, each said restoration signal and its complement restoration signal including an attribute representative of a particular one of said paths.

35. An apparatus as defined in claim 29, each said signal including an attribute representative of the number of spans and/or linking nodes in each said path at any given point along said path.

36. An apparatus as defined in claim 29, each said restoration signal and its complement restoration signal including a first attribute representative of a particular one of said paths and a second attribute representative of the number of spans and/or linking nodes in each said path at any given point along said path.

37. An apparatus as defined in claim 35, each said restoration signal and its complement restoration signal including third and fourth attributes identifying said one and said other of said pair of nodes.

38. An apparatus as defined in claim 36, each said restoration signal and its complement restoration signal including a fifth attribute representative of a network-wide identification of the node originating said signals.

39. An apparatus as defined in claim 29, further including:
means for designating one of said nodes as a SENDER node from which said restoration signals will originate and the other of said pair of nodes as a CHOOSER from which said complement restoration signals will originate.

40. An apparatus as defined in claim 38, wherein said designating means being operable to designate said nodes on the basis of an ordinal test conducted independently at each said SENDER and CHOOSER nodes.

41. An apparatus for restoring communications between a pair of nodes in a network having an arbitrary number of nodes and an arbitrary number of spans interconnecting said nodes, each said span having working circuits between nodes designated for transmitting actual communications traffic and spare circuits between nodes capable of, but not designated, transmitting actual communications traffic, said method comprising the steps of:
(a) means for designating one of said nodes of said pair of nodes as a SENDER node and the other of said pair of nodes as a CHOOSER node;
(b) means for establishing one or more independent communication paths between said SENDER node and said CHOOSER node through a series of spare circuits of spans interconnecting said SENDER and CHOOSER nodes with other nodes in said network, said means including:
  i. means for repeatedly transmitting restoration signals along each logical span of spare circuits departing said SENDER node up to the minimum of either the number of circuit restorations required or the number of spare circuits available to said SENDER node;
  ii. means for repeatedly retransmitting said restoration signals from said other nodes along logical spans of spare circuits departing said other nodes; and
  iii. means responsive to receipt of a restoration signal at said CHOOSER node for transmitting a complement restoration signal from said CHOOSER node along the logical span of the spare circuit upon which said restoration signal was received;
  iv. means for retransmitting said complement restoration signals from said other nodes along the logical span of the spare circuit on which said restoration was received and for connecting the port upon which said restoration signal was received with the port upon which said complement restoration signal was received whereby to permit communications traffic therebetween;
each said restoration signal and its complement restoration signal including a first attribute representative of a network-wide identifier for the node originating said signals, a second attribute identifying either said SENDER node or said CHOOSER node as a SOURCE node, a third attribute identifying either said CHOOSER node or said SENDER node as a TARGET node, a fourth attribute representative of a particular one of said paths, and a fifth, incrementable attribute representative of the number of spans and/or linking nodes in each said path at any given point along said path; and
(c) means for redirecting, through one or more of said paths, communications traffic received at input ports of each of said SENDER and CHOOSER nodes and intended for transmission through one or more failed spans interconnecting said SENDER and CHOOSER nodes.

42. A method as defined in claim 41, further including means for identifying spare circuits at said SENDER node and allocating a distinct restoration signal to each identified spare circuit.

43. An apparatus as defined in claim 42, wherein the restoration signals transmitted along said spare circuits departing said SENDER node differ only by the value of said fourth attribute.

44. An apparatus as defined in claim 42, wherein said retransmitting means being operable to increment said fifth attribute of received signals prior to retransmitting said signals.

45. An apparatus as defined in claim 42, further including means at said other nodes and said CHOOSER node for rejecting any received signal whose fifth attribute exceeds a predetermined value.

46. An apparatus as defined in claim 42, storage register means at each other node for storing the first restoration signal received in connection with a particular path and rejecting any other received restoration signals relating to said particular path.

47. An apparatus as defined in claim 42, storage register means for storing at each other node the first restoration signal received in connection with a particular path, and means for rejecting any other received restoration having the same first to fourth attributes but a larger fifth attribute and for replacing said stored signal with any new restoration signal having the same first to fourth attributes but a smaller fifth attribute.

48. An apparatus for restoring communications between a pair of nodes in a network having an arbitrary number of nodes and an arbitrary number of spans interconnecting said nodes, each said span having working circuits between nodes designated for transmitting actual communications traffic and spare circuits between nodes capable of, but not designated, transmitting actual communications traffic, said method comprising the steps of:
(a) means responsive to a communication failure in one or more circuits in one or more spans between said pair of nodes for designating one of said pair of nodes a SENDER node and the other of said pair of nodes a CHOOSER node;
(b) means for identifying spare circuits at said SENDER node and allocating a distinct restoration signal to each identified spare circuit;
(c) means for repeatedly transmitting restoration signals on the outgoing transmission link of each said identified spare circuits departing from said SENDER node, each said restoration signal including the identity of said SENDER node, the identity of said CHOOSER node, an INDEX value representative of the identity of a complete, independent route between said SENDER and said CHOOSER nodes starting at the spare circuit departing said SENDER node along which said signal is transmitted, and a predetermined initial REPEAT value;
(d) means responsive to receipt of one of said restoration signals at a TANDEM node for determining whether said TANDEM node is already transmitting a restoration signal having the same INDEX value as the just received restoration signal, ignoring any restoration signal having the same INDEX value as that of a signal said node is already transmitting and, if said node is not already transmitting a restoration signal having the same INDEX value, producing a modified restoration signal by incrementing said repeat value of said restoration signal and repeatedly transmitting said modified restoration signal along spare links departing said TANDEM node;

(e) means responsive to a modified restoration signal at said CHOOSER node for repeatedly transmitting a complement restoration signal from said CHOOSER node back through the same spare circuit along which said modified restoration signature was received, said restoration signal including the identity of said CHOOSER node, an INDEX value equal to the INDEX value of said modified restoration signal, and a predetermined initial REPEAT value;

(f) means responsive to a complement restoration signal at a TANDEM node for operatively connecting the port upon which said complement restoration signal was received with the port on which its corresponding restoration signal was received whereby to permit communications traffic therebetween, incrementing the repeat value of said complement restoration signal and transmitting the modified complement restoration signal back through the spare circuit along which said corresponding restoration signal was received; and (g) means responsive to a modified complement restoration signal at said SENDER node, operatively connecting the port containing communications traffic intended for one of said failed circuits to the port on which said modified complement signature was received.

49. An apparatus as defined in claim 48, said designating means for designation one of said pair of nodes a SENDER node and the other of said pair of nodes a CHOOSER node being operable on the basis of an ordinal test.

50. An apparatus as defined in claim 49, further including storage register means at each said SENDER, TANDEM and CHOOSER nodes, for storing received and transmitted signals and the identity of the port of upon which each said signals was received and transmitted.

51. An apparatus as defined in claim 50, wherein said restoration signal responsive means being operable to ignore any restoration signal whose REPEAT value is greater than a predetermined value.

52. An apparatus as defined in claim 51, wherein said modified restoration signal responsive means being operable to ignore any modified restoration signal whose REPEAT value is greater than a predetermined value.

53. An apparatus as defined in claim 52, wherein said restoration signal responsive means being operable to ignore a restoration signal having the same INDEX value and the same or greater REPEAT value as that of any restoration signal said node is already transmitting; and substitute a restoration signal having the same INDEX value and a smaller REPEAT value as that of any restoration signal said node is already transmitting.

54. An apparatus as defined in claim 53, said modified complement restoration signal responsive means being further operable to suspend transmission of all modified restoration signals having the same INDEX value as that of said received complement restoration signal.

55. An apparatus as defined in claim 54, each said signal further including a Node Identifier field for identifying the node originating a signal.

56. An apparatus as defined in claim 55, further including the step of encoding said restoration and complement restoration signals into a communications traffic signal.

57. In a communications network having an arbitrary number of nodes and an arbitrary number of spans interconnecting said nodes, each said span having working circuits between nodes designated for transmitting actual communications traffic and spare circuits between nodes capable of but not designated for the transmission of actual communications traffic, each said node having one or more bi-directional transmission interfaces connected to external transmission lines and to an internal switching matrix, each said transmission interface having circuit means for processing signals received along a receive link and feeding said received signal to said switching matrix and circuit means for processing transmit signals received from said switching matrix and applying said transmit signal to a transmit link, the improvement comprising a communications restoring apparatus for use at each said node and comprising:

restoration signature detecting circuit means at each said transmission interface for detecting and storing restoration signatures received along said receive link;

restoration signature transmitting circuit means at each said transmission interface for applying transmit signature signals to said transmit link; and control means operatively connected to said detecting circuit means and said transmitting circuit of each said transmission interface and being responsive to:

(a) an alarm signal indicative of a circuit failure in a span connecting said node and an adjacent node for generating and repeatedly applying predetermined restoration signature signals to said restoration signature transmitting circuit means of one or more of said transmitting interfaces whereby to cause said restoration signals to be transmitted along one or more transmitting links to other adjacent nodes;

(b) a restoration signature detected by said detecting circuit for producing modified restoration signatures and applying said modified restoration signatures to the transmitting circuit means of each said transmission interface of said node whereby to cause said modified restoration signatures to be transmitted along said transmitting links to adjacent nodes;

(c) a modified restoration signature received at the detecting circuit means of one of said transmission interfaces for generating a complement restoration signature signal and applying said complement restoration signature signal to said transmitting circuit means of said one of said transmission interfaces; and (d) a complement restoration signature received at the detecting circuit means of one of said transmission interfaces for either operatively connecting the receive and transmission links of the transmission interface at which said complement restoration signature signal was received with the transmission and receive links, respectively, of the transmission interface on which the restoration signature associated to said complement signal was received if said control means modified an existing restoration signature, or operatively connecting the receive and transmission links of the transmission interface at which said complement restoration signature signal was received with the transmission and receive links, respectively, of the transmission interface on which communications traffic intended to be transmitted through a failed circuit between said pair of nodes if said control means generated the original restoration signature associated with said complement restoration signature signal.

58. An apparatus as defined in claim 57, said signature receiving circuit means including:
   a signature detector circuit for recovering restoration signature attributes transparently encoded in a signal received on said received link and producing an output representative of said attributes;
   a signature reception register adapted to receive said detector circuit output;
   a receive signature storage register for storing attributes of a restoration signature; and
   a validity and logic control circuit means for comparing the contents of said signature reception register with the contents of said signature storage register and transferring the contents of the former into the latter and transmitting a flag to said control means that a new signature has been received.

59. An apparatus as defined in claim 57, said signature transmitting circuit means including:
   a transmit signature storage register for receiving and storing a transmit restoration signature;
   a transmit signature modulation circuit for modulating the contents of said transmit signature storage register into a transmit signal applied to said transmit signal processing circuit means; and
   control logic means responsive to said control means for loading a new signature into said transmit signature Storage Register and, once loaded, causing repeated circulation of the contents of the register whereby to cause said transmit restoration signature to be indefinitely, repeatedly applied to said modulation circuit.

60. An apparatus as defined in claim 57, further including:
   interface port number register means for storing the number of the port associated with said signature receiving and transmitting circuit means; and
   a port status register for storing predetermined port status information.

61. An apparatus as defined in claim 60, further including circuit failure alarm detection means associated with each said transmission interface and responsive to failures in said transmission and receive links of said associated transmission interface whereby to cause the contents of said port number register and said port status register to be transmitted to said control means.

62. An apparatus as defined in claim 58, said signature transmitting circuit means including:
   a transmit signature storage register for receiving and storing a transmit restoration signature;
   a transmit signature modulation circuit for modulating the contents of said transmit signature storage register into a transmit signal applied to said transmit signal processing circuit means; and
   control logic means responsive to said control means for loading a new signature into said transmit signature Storage Register and, once loaded, causing repeated circulation of the contents of the register whereby to cause said transmit restoration signature to be indefinitely, repeatedly applied to said modulation circuit.

63. An apparatus as defined in claim 62, further including:
   interface port number register means for storing the number of the port associated with said signature receiving and transmitting circuit means; and
   a port status register for storing predetermined port status information.

64. An apparatus as defined in claim 63, further including:
   circuit failure alarm detection means associated with each said transmission interface and responsive to said transmission and receive links of said associated transmission interface whereby to cause the contents of said port number register and said port status register to be transmitted to said control means.

65. An apparatus as defined in claim 62, each said restoration signal and its complement restoration signal including a first attribute representative of a network-wide identifier for the node originating said signals, a second attribute identifying either a SENDER node or a CHOOSER node as a SOURCE node, a third attribute identifying either said CHOOSER node or said SENDER node as a TARGET node, a fourth attribute representative of a particular one of said paths, and a fifth, incrementable attribute representative of the number of spans and/or linking nodes in each said path at any given point along said path, each said receive and transmit storage registers being adapted to store each said attributes of each received restoration signal and transmit complement restoration signal, respectively.

66. An apparatus as defined in claim 63, said Port Status Register being adapted to store a first signal indicative of whether receive and transmit links associated with said port status register is currently experiencing loss of transmission integrity, a second signal indicative of whether the circuit associated with said port is a working circuit or a spare circuit, a third signal indicative of whether said port is connected to another port of said node and a fourth signal representative of the identity of another port to which said port may be connected.

67. A Digital Crossconnect Machine for use as a node in a communications network having an arbitrary number of nodes and an arbitrary number of spans interconnecting said nodes, each said span having one or more working circuits interconnecting adjacent nodes and designated for transmitting actual communications traffic and spare circuits interconnecting adjacent nodes and capable of, but not designated, for the transmission of actual communications traffic, each said circuit having a transmit link and a receive link, said machine comprising:
   an operating system for controlling the operation of said machine;
   crossconnect switching matrix means for internally connecting interface ports of said machine;
   crosspoint controller means responsive to said operating system for controlling said switching matrix means;

one or more bi-directional transmission interfaces connected to external transmission lines and to an internal switching matrix, each said transmission interface having:

circuit means for processing signals received along the receive link of an associated working or spare circuit and feeding said received signal to said switching matrix;

circuit means for processing transmit signals received from said switching matrix and applying said transmit signal to a transmit link;

restoration signature detecting circuit means for detecting and storing restoration signatures applied to said received signal processing circuit means along said receive link; and restoration signature transmitting circuit means for applying transmit signature signals to said transmit signals processing circuit means for transmission along transmit link; and an emergency restoration controller operatively connected to each said transmission interface means, said crosspoint controller and said operating system and being responsive to a circuit failure alarm and/or restoration signature detected by said detecting circuit and cooperable with other Digital Crossconnect Machines in said network for establishing one or more independent communication paths between said pair of nodes through a series of spare circuits of spans interconnecting a pair of nodes between which communications have failed and other interconnected nodes and redirecting communications traffic intended for one or more failed spans through said one or more of said paths.

68. A Digital Crossconnect Machine as defined in claim 67, each said signature receiving circuit means including:

a signature detector circuit for recovering restoration signature attributes transparently encoded in a signal received on said received link and producing an output representative of said attributes;

a signature reception register adapted to receive said detector circuit output;

a receive signature storage register for storing attributes of a restoration signature; and a validity and logic control circuit means for comparing the contents of said signature reception register with the contents of said signature storage register and transferring the contents of the former into the latter and transmitting a flag to said control means that a new signature has been received.

69. An Digital Crossconnect Machine as defined in claim 67, each said signature transmitting circuit means including:

a transmit signature storage register for receiving and storing a transmit restoration signature;

a transmit signature modulation circuit for modulating the contents of said transmit signature storage register into a transmit signal applied to said transmit signal processing circuit means; and control logic means responsive to said control means for loading a new signature into said transmit signature Storage Register and, once loaded, causing repeated circulation of the contents of the register whereby to cause said transmit restoration signature to be indefinitely, repeatedly applied to said modulation circuit.

70. A Digital Crossconnect Machine as defined in claim 67, each said transmission interface means further including:

an interface port number register for storing the number of the port associated with said signature receiving and transmitting circuit means; and a port status register for storing predetermined port status information.

71. A Digital Crossconnect Machine as defined in claim 67, each said transmission interface means further including:

circuit failure alarm detection means associated with each said transmission interface and responsive to said transmit and receive links of said associated transmission interface whereby to cause the contents of said port number register and said port status register to be transmitted to said control means.

72. A Digital Crossconnect Machine as defined in claim 68, each said signature transmitting circuit means including:

a transmit signature storage register for receiving and storing a transmit restoration signature;

a transmit signature modulation circuit for modulating the contents of said transmit signature storage register into a transmit signal applied to said transmit signal processing circuit means; and control logic means responsive to said control means for loading a new signature into said transmit signature Storage Register and, once loaded, causing repeated circulation of the contents of the register whereby to cause said transmit restoration signature to be indefinitely, repeatedly applied to said modulation circuit.

73. A Digital Crossconnect Machine as defined in claim 72, each said transmission interface means further including:

an interface port number register for storing the number of the port associated with said signature receiving and transmitting circuit means; and a port status register for storing predetermined port status information.

74. A Digital Crossconnect Machine as defined in claim 73, each said transmission interface means further including:

circuit failure alarm detection means responsive to said transmission and receive links of said associated transmission interface whereby to cause the contents of said port number register and said port status register to be transmitted to said control means.

75. An apparatus as defined in claim 74, each said restoration signal and its complement restoration signal including a first attribute representative of a network-wide identifier for the node originating said signals, a second attribute identifying either a SENDER node or a CHOOSER node as a SOURCE node, a third attribute identifying either said CHOOSER node or said SENDER node as a TARGET node, a fourth attribute representative of a particular one of said paths, and a fifth, incrementable attribute representative of the number of spans and/or linking nodes in each said path at any given point along said path, each said receive and transmit storage registers being adapted to store each said attributes of each received restoration signal and transmit complement restoration signal, respectively.

76. An apparatus as defined in claim 75, said Port Status Register being adapted to store a first signal indicative of whether receive and transmit links associated with said port status register is currently experiencing loss of transmission integrity, a second signal indicative of whether the circuit associated with said port is a working circuit or a spare circuit, a third signal indicative of whether said port is connected to another port of said node and a fourth signal representative of the identity of another port to which said port may be connected.

* * * * *